US008037608B2

(12) United States Patent
Schnak et al.

(10) Patent No.: US 8,037,608 B2
(45) Date of Patent: Oct. 18, 2011

(54) RAZOR WITH CLAMP FORCE HOUSING FOR BATTERY

(75) Inventors: Fred Schnak, Kronberg (DE); Luis Burrel, Kettenhofweg (DE); Stefan Rehbein, Schumannstr (DE); Gerrit Rönneberg, Darmstadt (DE); Uwe Schaaf, Alsbach-Hähnlein (DE)

(73) Assignee: The Gillette Company, Boston, MA (US)

( * ) Notice: Subject to any disclaimer, the term of this patent is extended or adjusted under 35 U.S.C. 154(b) by 201 days.

(21) Appl. No.: 11/220,095

(22) Filed: Sep. 6, 2005

(65) Prior Publication Data

US 2007/0050997 A1 Mar. 8, 2007

(51) Int. Cl.

*B21B 21/40* (2006.01)
*B21B 21/00* (2006.01)
*H01M 2/02* (2006.01)
*H01M 2/10* (2006.01)

(52) U.S. Cl. .................. 30/45; 30/210; 429/96; 429/99; 429/100

(58) Field of Classification Search .............. 30/45, 210, 30/500, 44, 216; 429/96–100, 123, 164, 429/10; 206/703–705; 224/902; 204/248, 204/196.01; 362/202–204; 320/114, 115; 174/46; 16/423, 425, 111.1
See application file for complete search history.

(56) References Cited

U.S. PATENT DOCUMENTS 2,309,035 A * 1/1943 Beam ............................ 362/115
2,311,439 A * 2/1943 Iwanowicz .................... 362/579
2,963,598 A 12/1960 Kent
2,993,948 A 7/1961 Vaclaw
3,035,191 A * 5/1962 Kent ............................... 310/50
3,611,568 A * 10/1971 Alexander et al. ................ 30/45
3,772,779 A 11/1973 Douglass et al.
3,842,498 A * 10/1974 Mizobata et al. ............ 30/43.92
4,213,078 A 7/1980 Ferrell et al. ....................... 320/2
4,744,144 A * 5/1988 Lowery, Sr. et al. .............. 30/45
4,835,452 A * 5/1989 Kuriyama ...................... 320/114
5,445,900 A 8/1995 Miller, Jr. et al. ................. 429/1
5,476,729 A 12/1995 Miller, Jr. et al. ................. 429/1
5,544,415 A * 8/1996 Huang .......................... 30/43.92
5,770,328 A 6/1998 Friedli et al. ..................... 429/96
5,933,962 A * 8/1999 Labarbara ......................... 30/45
6,094,357 A * 7/2000 Deubler et al. ............... 361/782
6,273,586 B1 * 8/2001 Schuloff ....................... 362/208

(Continued)

FOREIGN PATENT DOCUMENTS

GB 2 042 787 A 9/1980

OTHER PUBLICATIONS

Copending Application U.S. Appl. No. 11/115,885, filed Apr. 27, 2005.

(Continued)

*Primary Examiner* — Laura M. Lee
(74) *Attorney, Agent, or Firm* — Ronald Terk Sia; Kevin C. Johnson; Steven W. Miller

(57) ABSTRACT

Razor handles are provided, for razors having a battery-powered functionality. The razor handles include a housing constructed to hold a battery, and, within the housing, a carrier including a pair of battery clamp fingers configured to exert a clamping force against the battery when the battery is in place in the housing.

17 Claims, 25 Drawing Sheets

U.S. PATENT DOCUMENTS

| | | | | |
|---|---|---|---|---|
| 6,294,287 | B1 * | 9/2001 | Lee et al. | 429/120 |
| 6,582,848 | B2 * | 6/2003 | Peterson | 429/99 |
| 2001/0023538 | A1 * | 9/2001 | Muraguchi et al. | 30/43.92 |
| 2002/0045093 | A1 | 4/2002 | Imamura et al. | 429/96 |
| 2002/0127468 | A1 | 9/2002 | Wani et al. | 429/96 |
| 2003/0019078 | A1 * | 1/2003 | Lauer | 16/110.1 |
| 2003/0224247 | A1 * | 12/2003 | Wheeler et al. | 429/159 |
| 2004/0013938 | A1 | 1/2004 | Murashige et al. | 429/96 |
| 2004/0172831 | A1 * | 9/2004 | Paas et al. | 30/45 |
| 2005/0034307 | A1 * | 2/2005 | Brzezinski | 30/34.05 |
| 2006/0032055 | A1 * | 2/2006 | Simms et al. | 30/34.05 |
| 2006/0143926 | A1 * | 7/2006 | Khubani et al. | 30/53 |
| 2006/0260142 | A1 * | 11/2006 | Dombrowski et al. | 30/526 |
| 2006/0288581 | A1 * | 12/2006 | Rogatschnig | 30/34.1 |

OTHER PUBLICATIONS

Sample M3Power™ Razor.

PCT International Search Report with Written Opinion in corresponding Int'l appln. PCT/IB2006/053083 dated Jan. 29, 2007.

* cited by examiner

RAZOR WITH CLAMP FORCE HOUSING FOR BATTERY

TECHNICAL FIELD

This invention relates to razors, and more particularly to razors for wet shaving that include a battery-powered functionality.

BACKGROUND

In many small battery-operated devices, the batteries are replaceable by the user, and are inserted and removed from a battery compartment through an opening having a cover. It is undesirable that the battery or batteries move or rattle around within the compartment, as this may damage the batteries or the device and/or may cause undesirable noise. It is also undesirable to have the batteries fall out if the device is inverted with the battery cover removed.

SUMMARY

The present invention provides a handle for a razor having a battery-powered functionality, in which the battery is held in place to reduce movement of the battery during use and transport of the razor. In some implementations, the battery will not fall out of its own weight when the razor is inverted with the battery cover removed, but can be easily removed by the user for replacement.

In one aspect, the invention features a handle for a razor having a battery-powered functionality, including (a) a housing constructed to hold a battery, and (b) within the housing, a carrier including a pair of battery clamp fingers configured to exert a clamping force against the battery when the battery is in place in the housing.

Some implementations include one or more of the following features. The clamping force may be sufficient to inhibit vibration of the battery within the grip tube. The clamping force may also be sufficient to prevent the battery from falling out of the housing when the housing is held with a long axis of the housing oriented vertically. Each finger may exert, for example, a spring force of about 0.5 N when a battery having a diameter of 9.5 mm is inserted into the housing, and less than about 2.5 N when a battery having a diameter of 10.5 mm is inserted into the housing. The housing may include a battery opening, and the fingers may exert a predetermined force on the battery that is such that, when the razor handle is held with the battery opening pointing downwards, a battery having a diameter of 9.5 mm will not fall out and a battery having a diameter of 10.5 mm can be taken out easily.

The carrier may include open areas through which the battery can be grasped by a user to facilitate battery removal. The handle may further include an insulation sleeve surrounding the carrier, for example, a plastic foil sleeve. The fingers may extend longitudinally, parallel to a long axis of the battery. The housing may include a unitary grip portion constructed to receive a razor head at one end thereof; and a battery cover, mounted on the grip portion. The grip portion and the battery cover, when joined, may together define a water-tight unit prior to mounting of the razor head on the grip portion. The razor handle may further include electronic components, mounted on the carrier, in electrical communication with the battery, and/or a switch for actuating the battery-powered functionality, also mounted on the carrier. The carrier may include a portion constructed to engage a corresponding portion of the battery cover.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Overall Razor Structure

Figure 1:
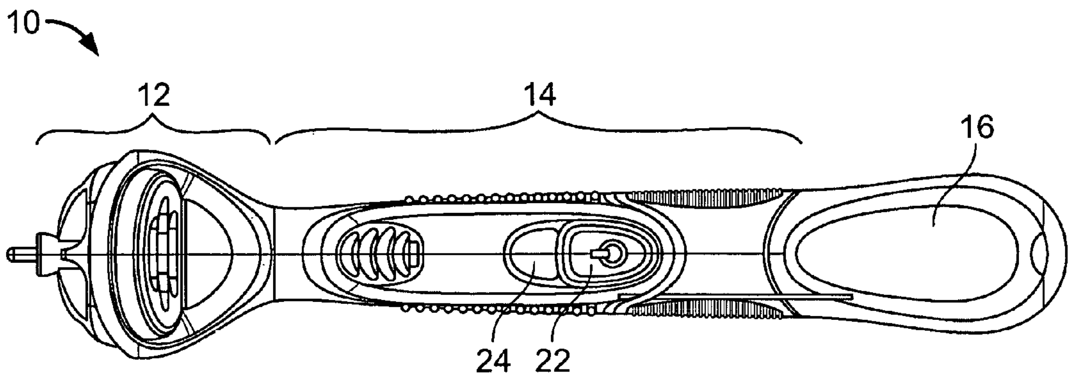
FIG. 1 is a top view of a razor handle according to one embodiment.
Figure 1A:
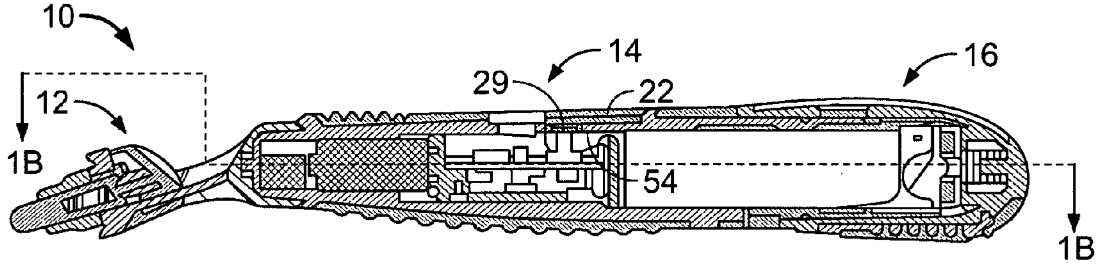
FIGS. 1A and 1B are cross sectional views of the razor handle of FIG. 1.
Figure 1B:
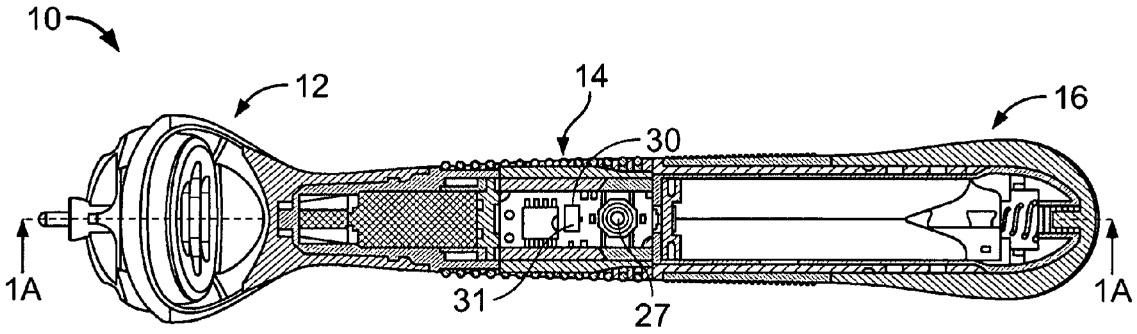
Figure 2:
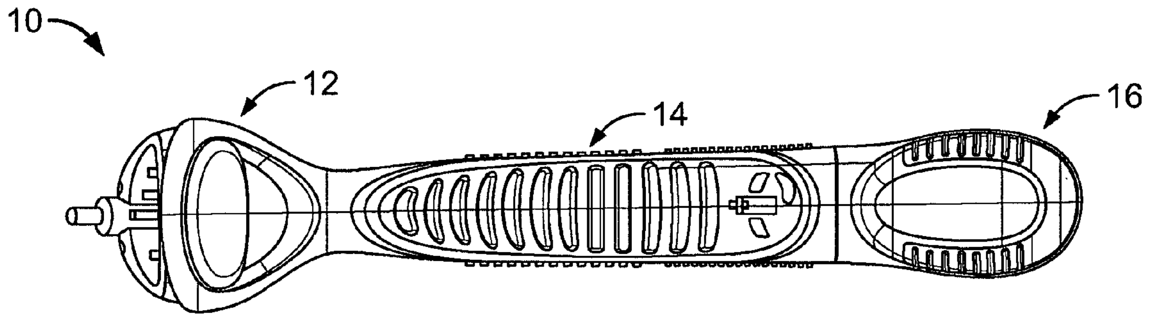
FIG. 2 is a bottom view of the razor handle of FIG. 1.
Figure 5:
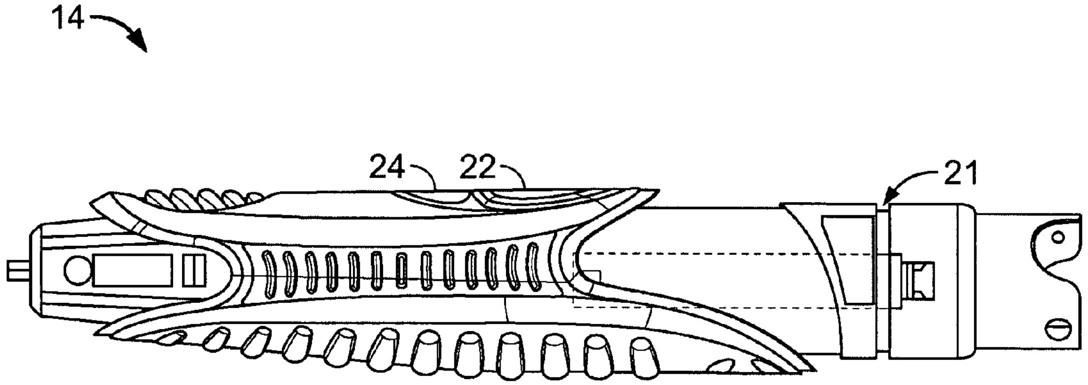
FIG. 5 is a side view of the grip tube.
Figure 3:
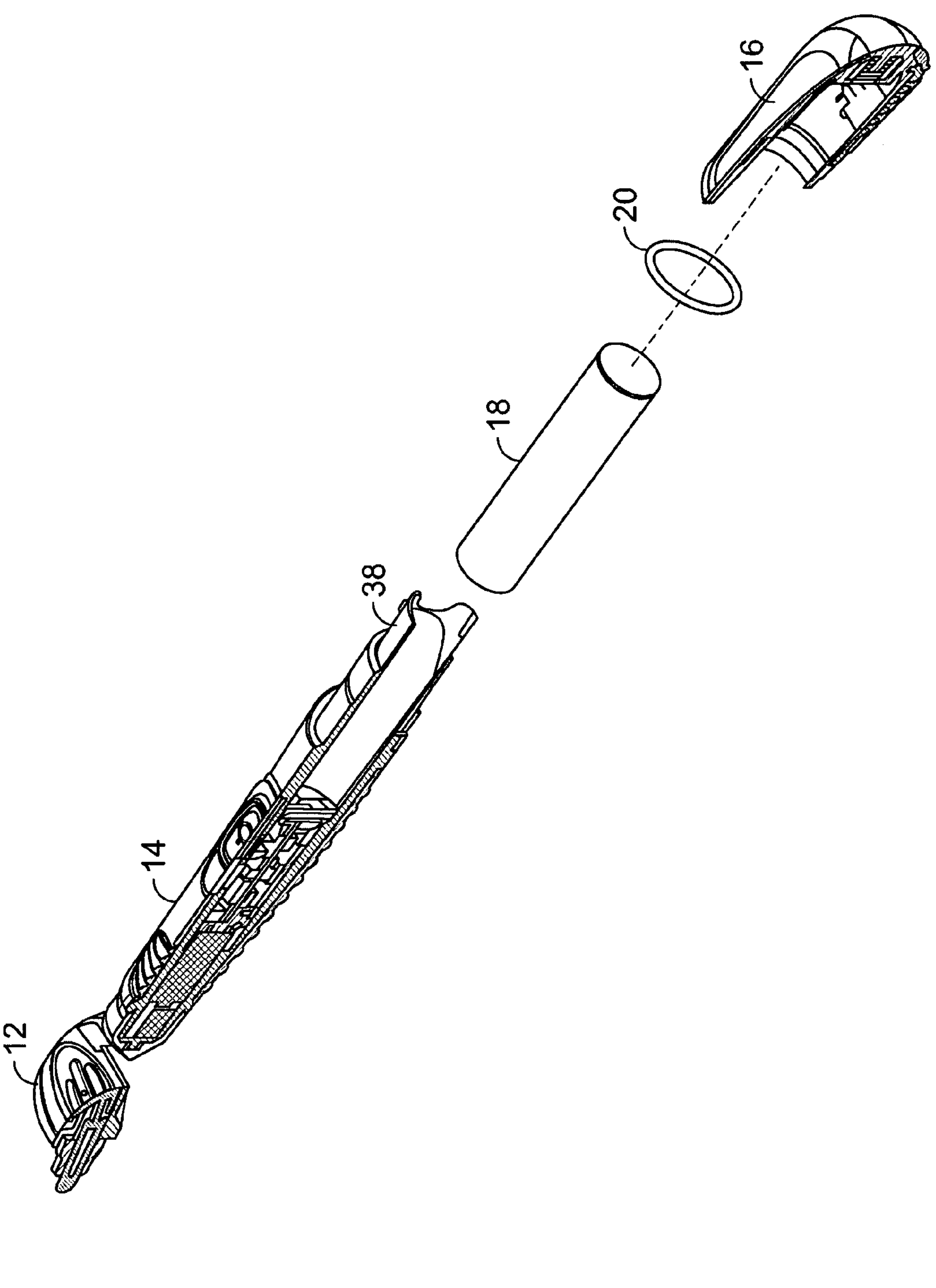
FIG. 3 is a partially exploded view of the razor handle of FIG. 1.

Referring to FIG. 1, a razor handle 10 includes a razor head 12, a grip tube 14, and a battery shell 16. The razor head 12 includes a connecting structure for mounting a replaceable razor cartridge (not shown) on the handle 10, as is well known in the razor art. The grip tube 14 is constructed to be held by a user during shaving, and to contain the components of the razor that provide the battery-powered functionality of the razor, e.g., a printed circuit board and a motor configured to cause vibration. The grip tube is a sealed unit to which the head 12 is fixedly attached, allowing modular manufacturing and providing other advantages which will be discussed below. Referring to FIG. 3, the battery shell 16 is removably attached to the grip tube 14, so that the user may remove the battery shell to replace the battery 18. The interface between the battery shell and grip tube is sealed, e.g., by an O-ring 20, providing a water-tight assembly to protect the battery and electronics within the razor. The O-ring 20 is generally mounted in groove 21 (FIG. 5) on the grip tube, e.g., by an interference fit. Referring again to FIG. 1, the grip tube 14 includes an actuator button 22 that may be pressed by the user to actuate the battery-powered functionality of the razor via an electronic switch 29 (FIG. 7A). The grip tube also includes a transparent window 24 to allow the user to view a light 31 or display or other visual indicator (FIG. 7A), e.g., an LED or LCD, that provides a visual indication to the user of battery status and/or other information. The light 31 shines through an opening 45 (FIG. 8) provided in the grip tube beneath the transparent window. These and other features of the razor handle will be described in further detail below.

Modular Grip Tube Structure

Figure 4:
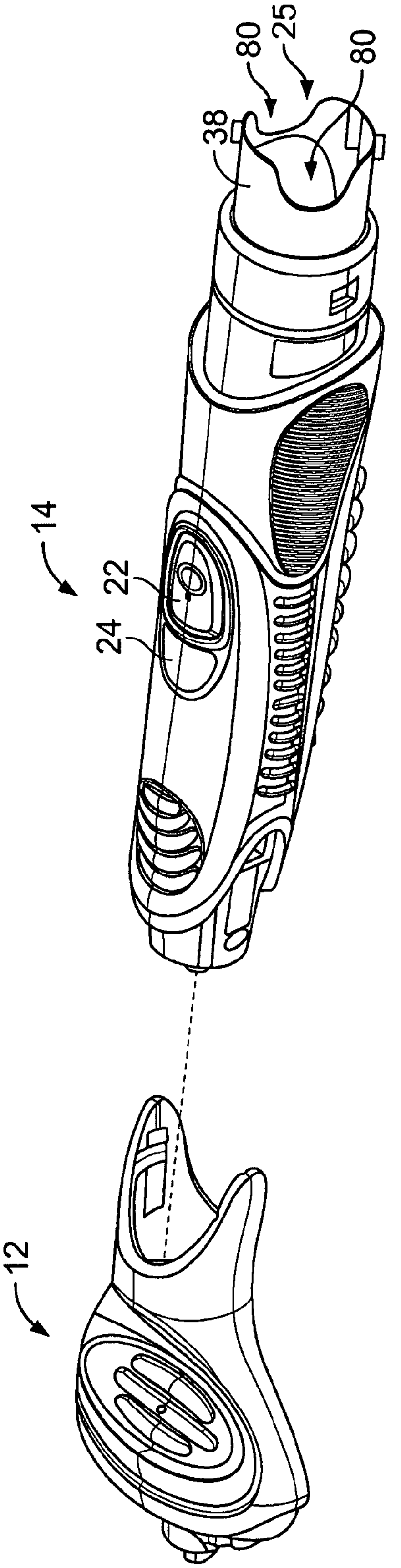
FIG. 4 is a perspective view of the head tube exploded from the grip tube of the razor.

As discussed above, the grip tube 14 (shown in detail in FIGS. 4 and 5) is a modular assembly, to which the razor head 12 is fixedly attached. The modularity of the grip tube advantageously allows a single type of grip tube to be manufactured for use with various different razor head styles. This in turn simplifies manufacturing of "families" of products with different heads but the same battery-powered functionality. The grip tube is water-tight except for the opening 25 at the end to which the battery shell is attached, and is preferably a single, unitary part. Thus, the only seal that is required to ensure water-tightness of the razor handle 10 is the seal between the grip tube and the battery shell, provided by O-ring 20 (FIG. 3). This single-seal configuration minimizes the risk of water or moisture infiltrating the razor handle and damaging the electronics.

Figure 6:
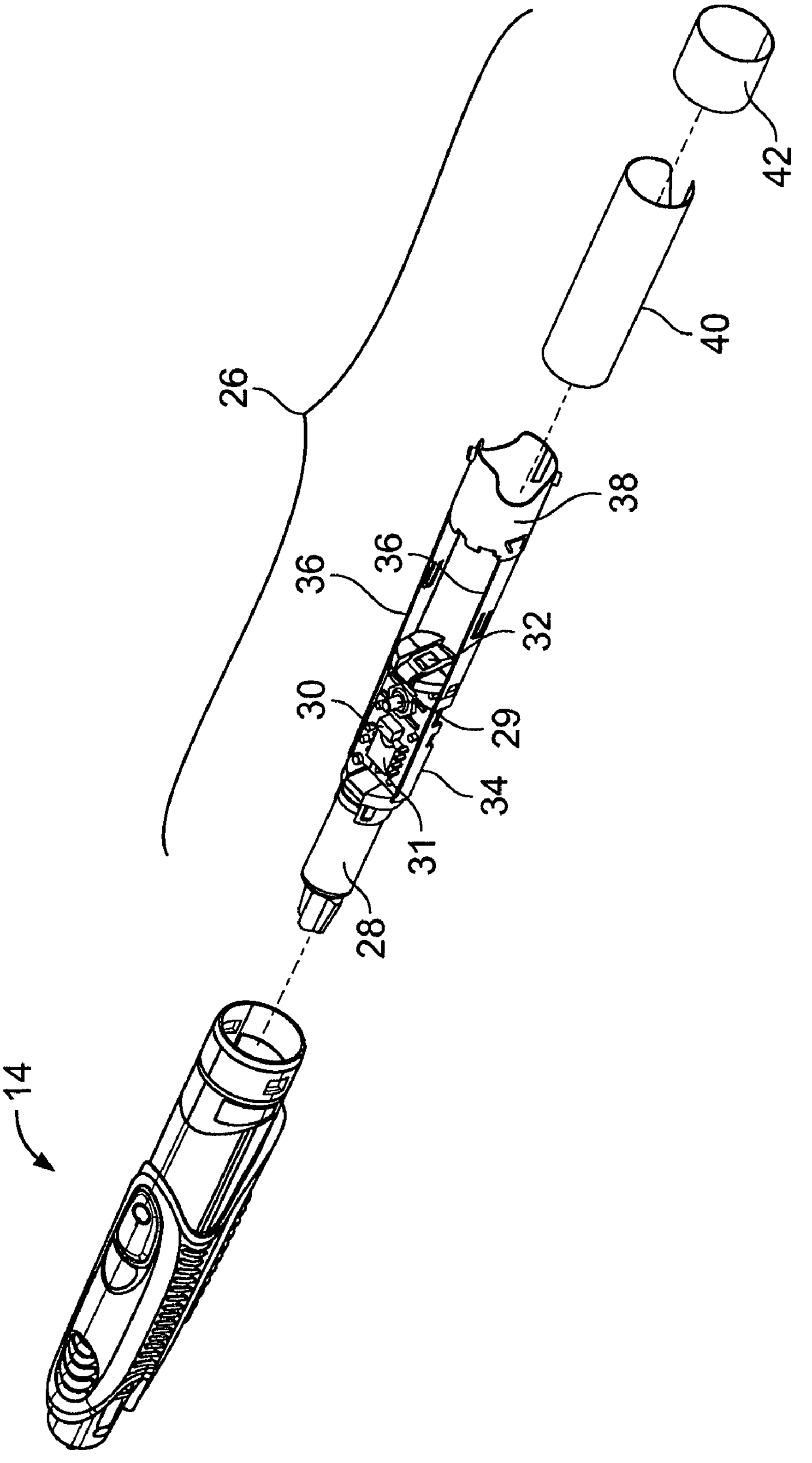
FIG. 6 is an exploded view of the grip tube showing the components contained therein.

As shown in FIG. 6, the grip tube 14 contains a subassembly 26 (also shown in FIG. 7C) which includes a vibration motor 28, a printed circuit board 30, an electronic switch 29 and the light 31 mounted on the printed circuit board, and the positive contact 32 for providing battery power to the electronics. These components are assembled within a carrier 34 which also includes battery clamp fingers 36 and a male bayonet portion 38, the functions of which will be discussed in the Battery Clamp and Battery Shell Attachment sections below. The assembly of all the functional electronic components of the razor onto the carrier 34 allows the battery-powered functionality to be pre-tested so that failures can be detected early, minimizing costly scrapping of completed razors. Subassembly 26 also includes an insulation sleeve 40 and mounting tape 42, the function of which will be discussed in the Battery Clamp section below.

Figure 7:
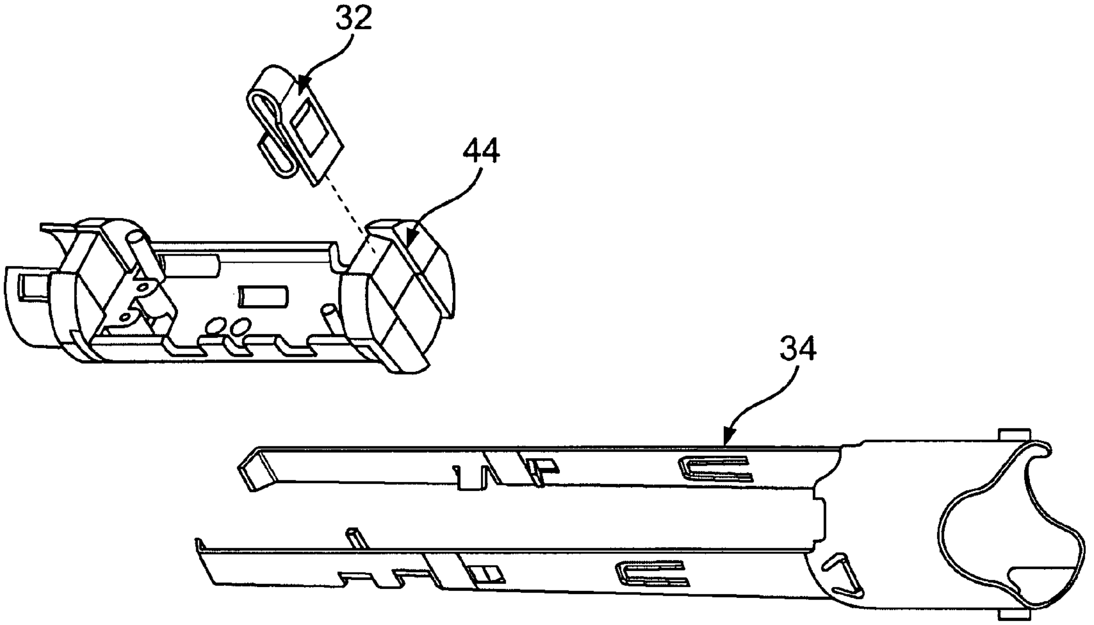
FIGS. 7-7C are exploded views illustrating the assembly of the components contained in the grip tube.
Figure 7A:
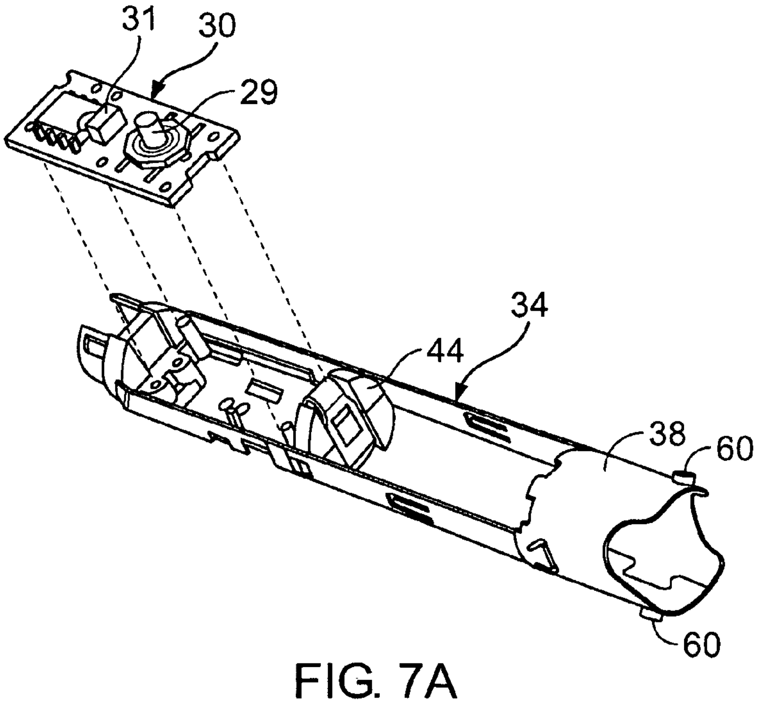
Figure 7B:
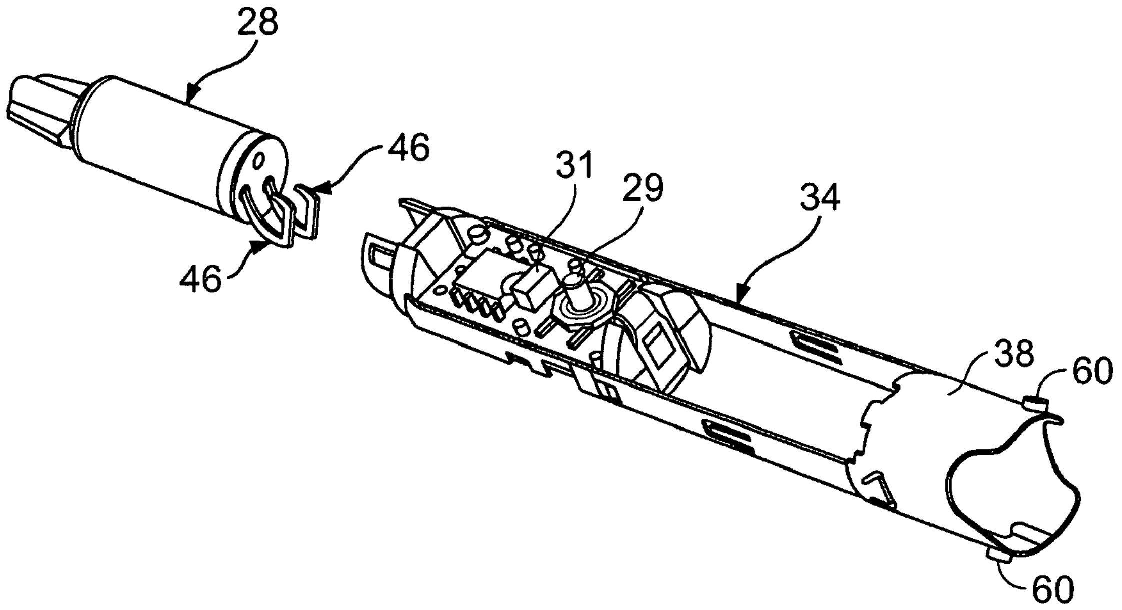
Figure 7C:
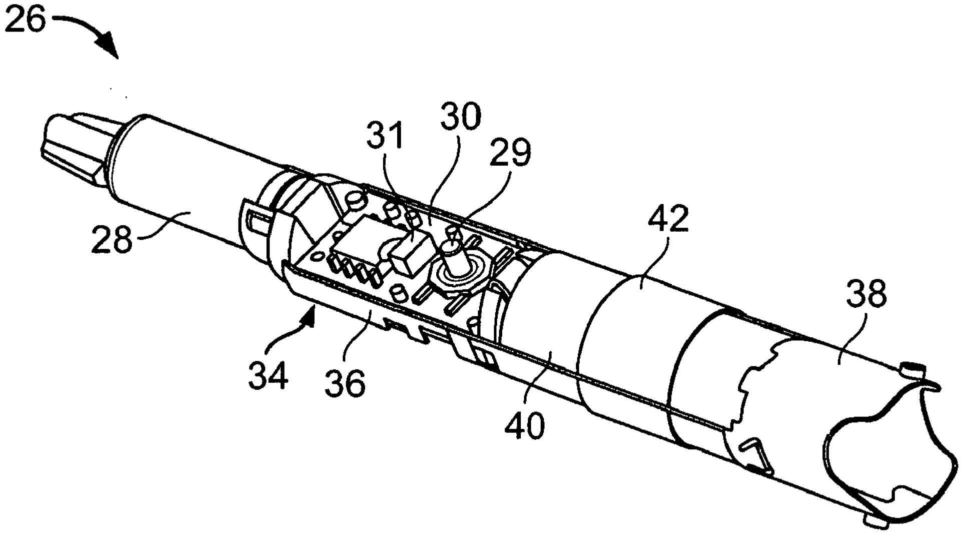

The subassembly 26 is assembled as shown in FIGS. 7-7C. First, the positive contact 32 is assembled onto a PCB carrier 44, which is then mounted on carrier 34 (FIG. 7). Next, the printed circuit board 30 is placed in the PCB carrier 44 (FIG. 7A), and the vibration motor 28 is mounted on the carrier 34 (FIG. 7B) with lead wires 46 being soldered onto the printed circuit board to complete the subassembly 26 (FIG. 7C). The subassembly may then be tested prior to assembly into the grip tube.

The subassembly 26 is assembled into the grip tube so that it will be permanently retained therein. For example, the subassembly 26 may include protrusions or arms that engage corresponding recesses in the inner wall of the grip tube in an interference fit.

Figure 8:
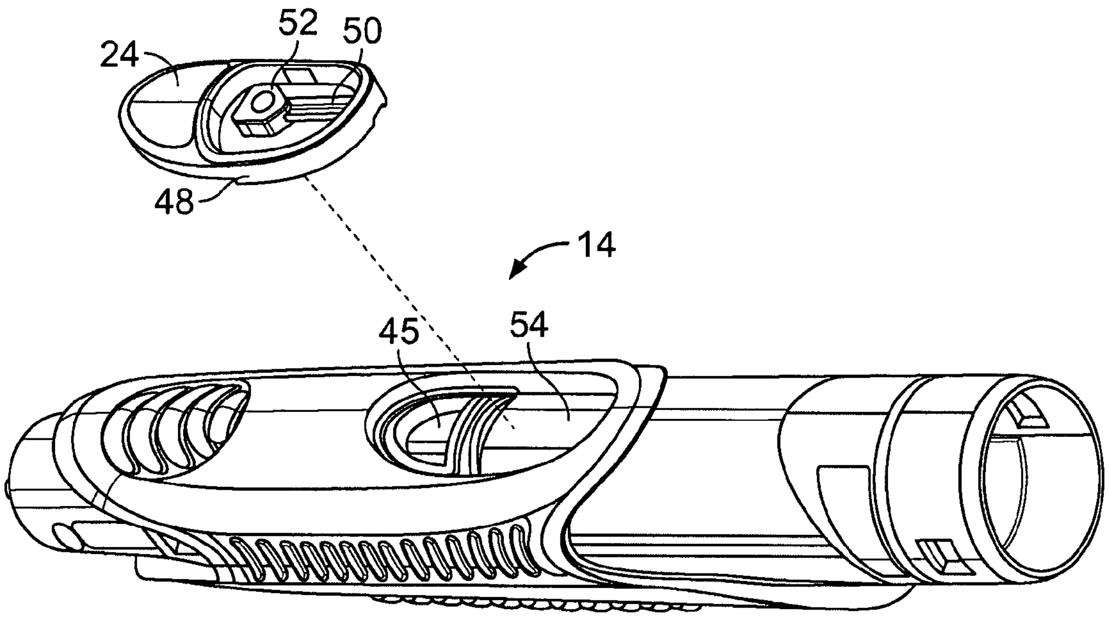
FIG. 8 is a perspective view of the grip tube with the LED window exploded from the tube and the actuator button omitted.
Figure 8A:
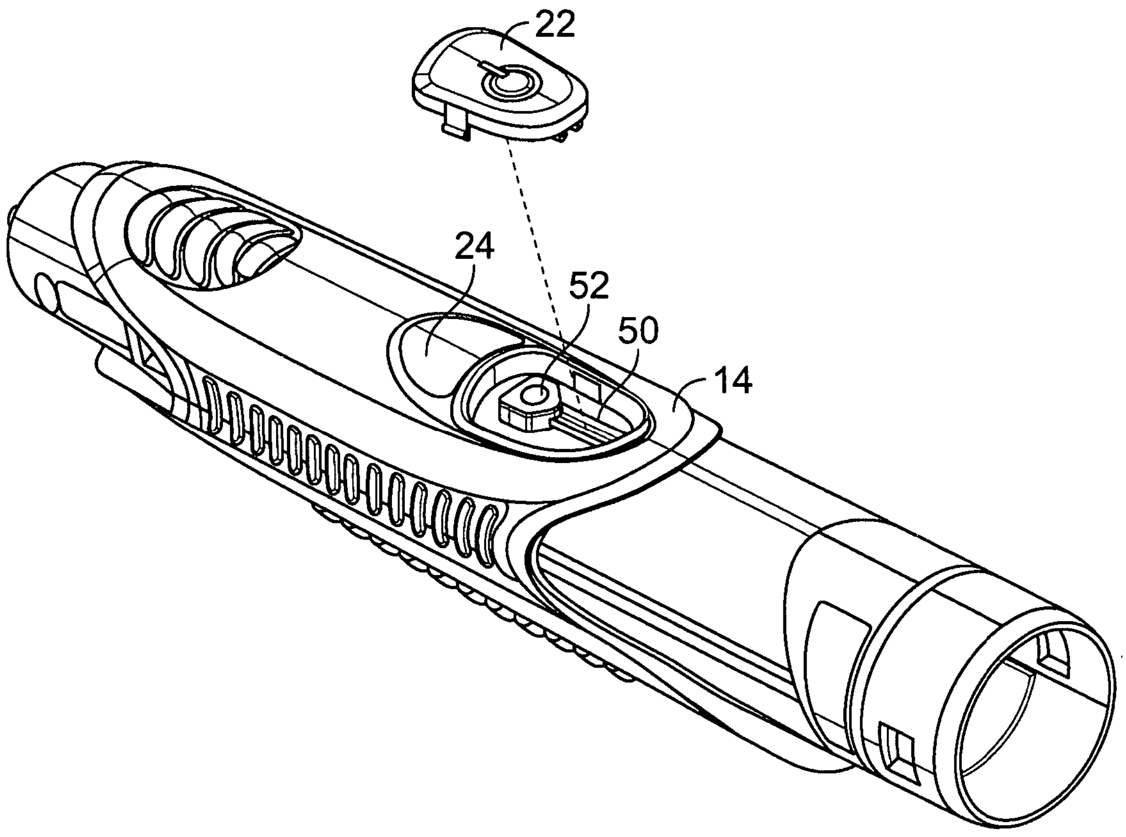
FIG. 8A is a perspective view of the grip tube with the LED window welded in place and the actuator button exploded from the tube.
Figure 8B:
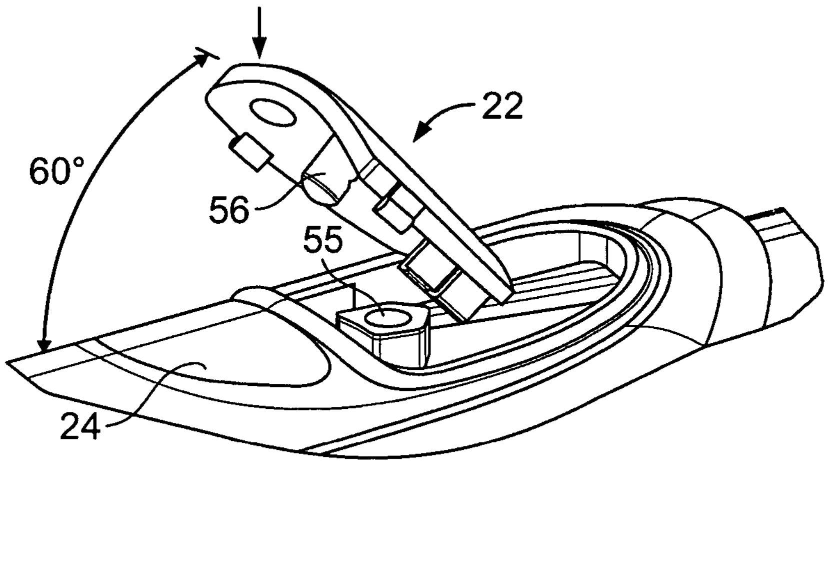
FIGS. 8B-8D are enlarged perspective views of a portion of the grip tube, showing steps in assembly of the actuator button onto the tube.

The grip tube also includes an actuator button 22. The rigid actuator button is mounted on a receiving member 48 (FIG. 8) that includes the window 24, discussed above. The receiving member 48 includes a cantilevered beam 50 that carries an actuator member 52. Actuator member 52 transmits force that is applied to the button 22 to an underlying resilient membrane 54 (FIG. 8). Membrane 54 may be, for example, an elastomeric material that is molded onto the grip tube to form not only the membrane but also an elastomeric gripping portion. The cantilevered beam, acting in concert with the membrane, provides a restoring force to return the button 22 to its normal position after it is depressed by a user. When the button is depressed, the actuator member 52 contacts the underlying electronic switch 29, which activates the circuitry of the PCB 30. Activation may be by a "push and release" on/off action or other desired action, e.g., push on/push off. The electronic switch 29 makes an audible "click" when actuated, giving the user feedback that the device has been correctly turned on. The switch is preferably configured to require a relatively high actuation force applied over a small distance (e.g., at least 4 N applied over about an 0.25 mm displacement). This switch arrangement, combined with the recessed, low profile geometry of button 22, tends to prevent the razor from being accidentally turned on during travel, or inadvertently turned off during shaving. Moreover, the structure of the switch/membrane/actuator member assembly provides the user with good tactile feedback. The actuator member 52 also holds the button 22 in place, the aperture 55 in the center of the actuator member 52 receiving a protrusion 56 on the underside of the button 22 (FIG. 8B).

Adjacent to the button 22 is the transparent window 24, through which the user can observe the indications provided by the underlying light, which are described in detail in the Electronics section below.

Figure 8C:
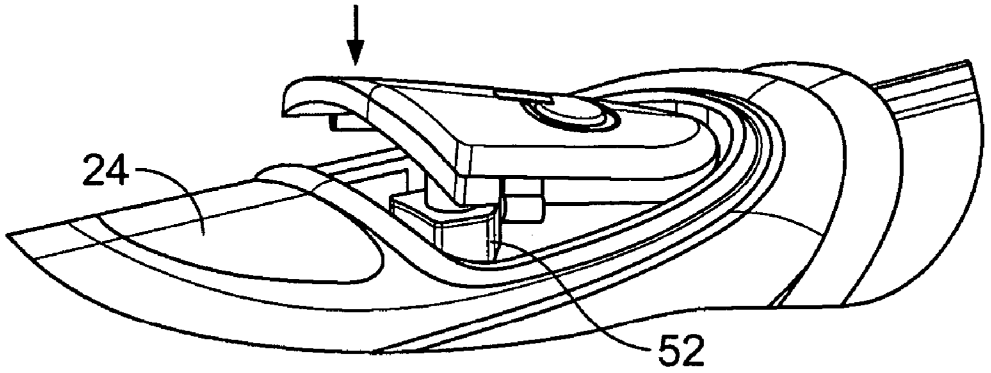
Figure 8D:
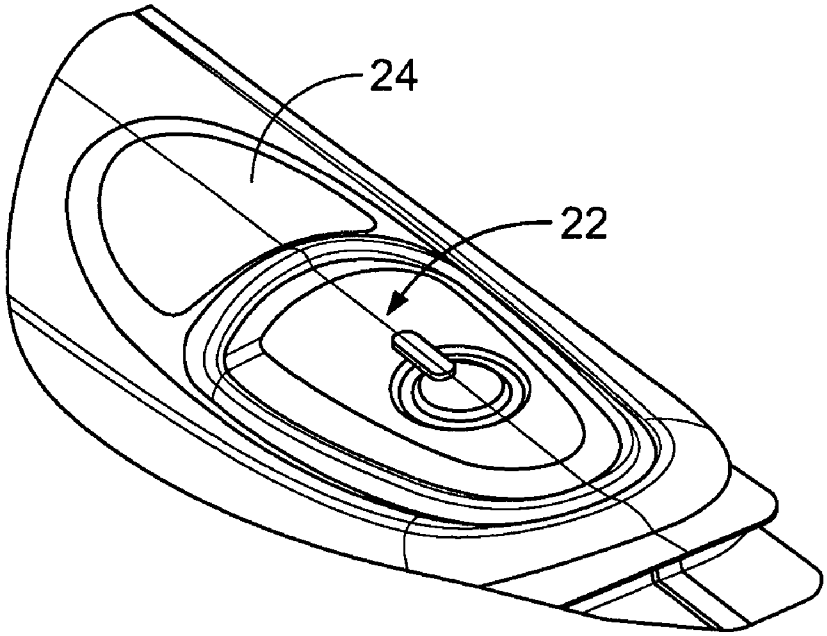

Assembly of the window 24 and actuator button onto the grip tube, is illustrated in FIGS. 8-8D. First, the receiving member 48, carrying the window 24, is sealingly mounted on the grip tube, e.g., by gluing or ultrasonic or heat welding (FIG. 8), to form the unitary water-tight part discussed above. Next, the button 22 is slid into place and gently (preferably with less than 10 N force) pushed down into the opening in the receiving member, causing the protrusion 56 to engage the aperture 55 (FIGS. 8A-8C).

Battery Shell Attachment

Figure 9:
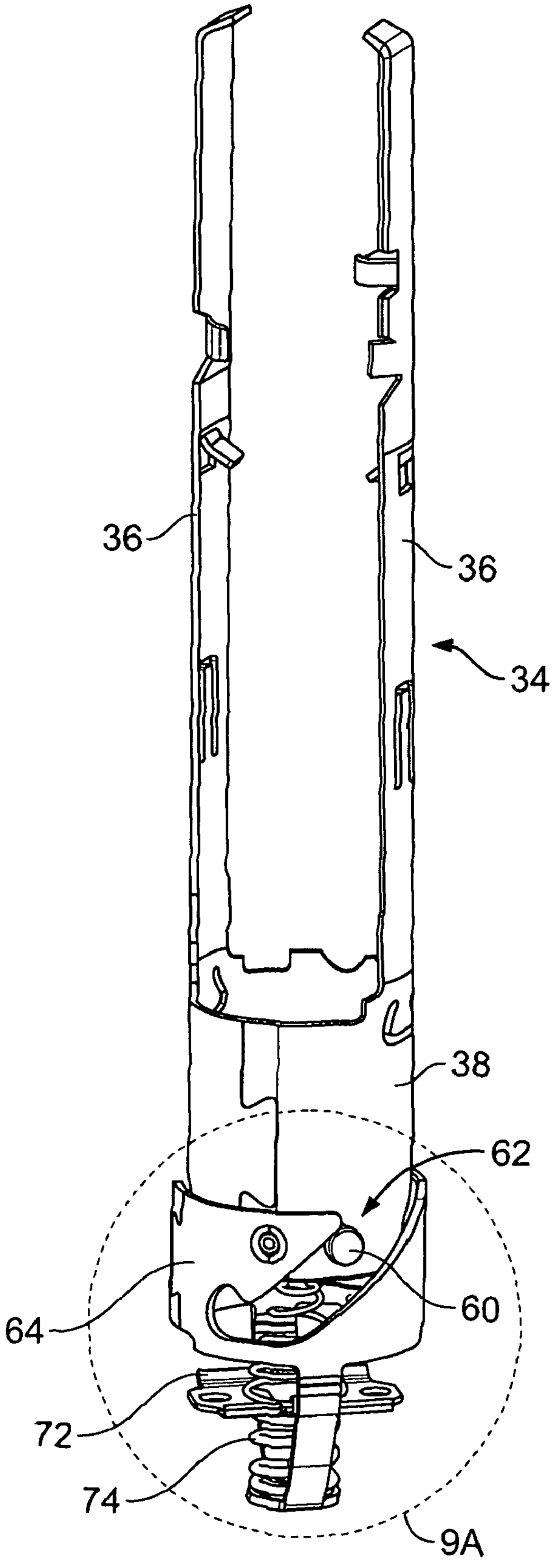
FIG. 9 is a perspective view of a bayonet assembly used in the razor of FIG. 1.
Figure 9A:
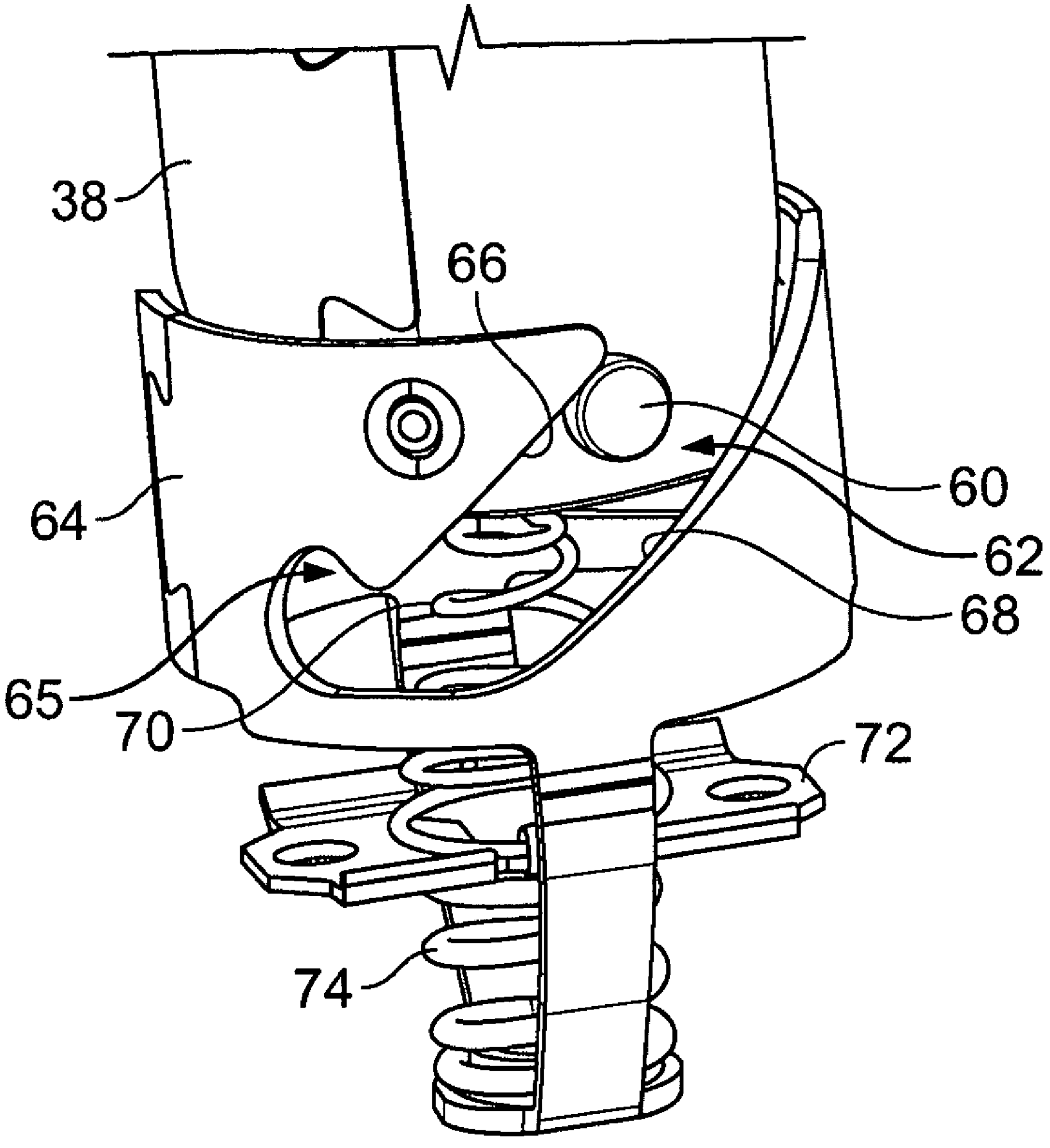
FIG. 9A is an enlarged detail view of area A in FIG. 9.
Figure 10:
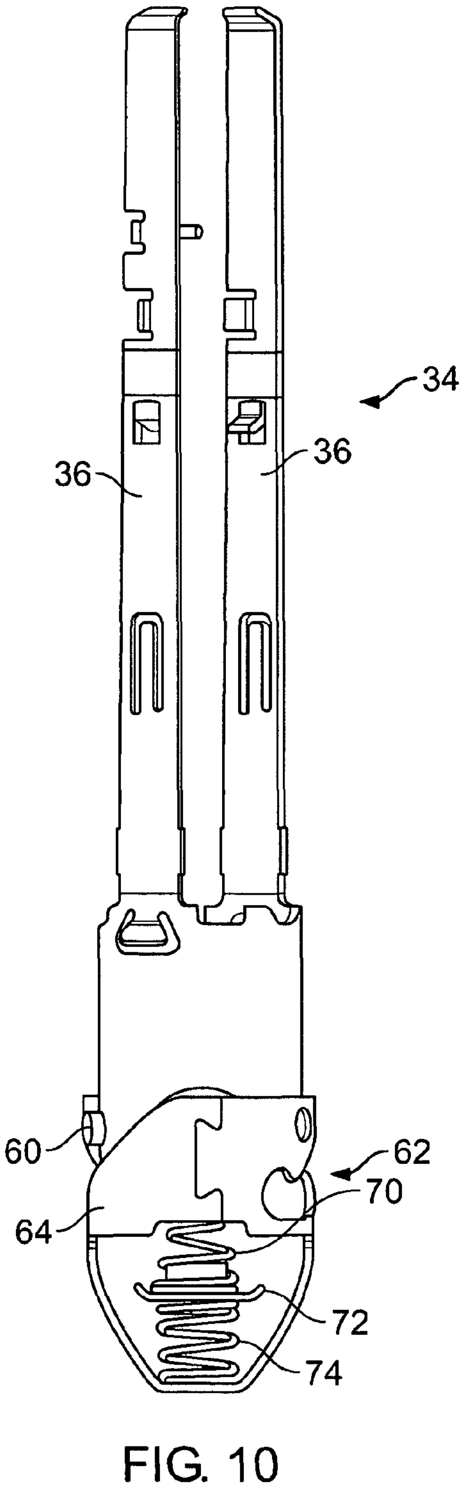
FIG. 10 is a side view of the bayonet assembly shown in FIG. 9, rotated 90 degrees with respect to the position of the assembly in FIG. 9.
Figure 11:
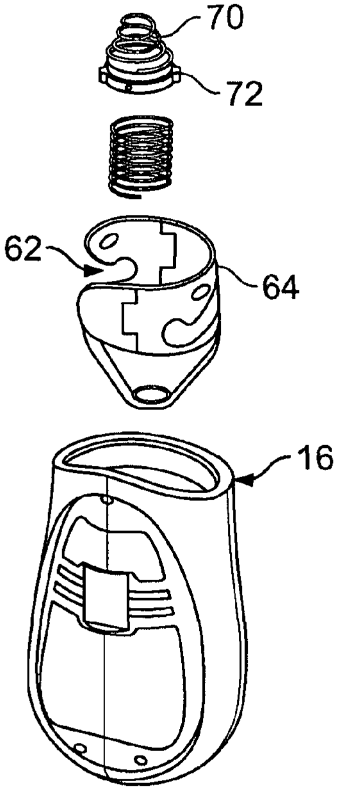
FIG. 11 is an exploded view of the lower portion of the bayonet assembly and the battery shell that contains the lower portion.

As discussed above, the battery shell 16 is removably attached to the grip tube 14, allowing removal and replacement of the battery. The two parts of the handle are connected, and electrical contact is established between the negative terminal of the battery and the electronic components, by a bayonet connection. The grip tube carries the male portion of the bayonet connection, while the battery shell carries the female portion. The assembled bayonet connection, with the grip tube and battery shell omitted for clarity, is shown in FIGS. 9, 9A and 10.

The male bayonet portion 38 of the carrier 34, discussed above, provides the male portion of the bayonet connection. Male bayonet portion 38 carries a pair of protrusions 60. These protrusions are constructed to be received and retained in corresponding slots 62 in a female bayonet component 64, carried by the battery shell. Each slot 62 includes a lead-in having angled walls 66, 68 (FIG. 9A), to guide each protrusion into the corresponding slot as the battery shell is rotated relative to the grip tube. A detent area 65 (FIG. 9A) is provided at the end of each slot 62. The engagement of the protrusions in the detent areas 65 (FIG. 9B) provides a secure, twist-on mechanical connection of the battery shell to the grip tube.

The carrier 34 and the female bayonet component 64 are both made of metal, and thus engagement of the protrusions with the slots also provides electrical contact between the carrier and the female bayonet component. The carrier is in turn in electrical contact with circuitry of the device, and the negative terminal of the battery is in contact with a battery spring 70 (FIG. 9A) that is in electrical communication with the female bayonet component, and thus contact of the spring members and electrical part ultimately results in contact between the battery and the circuitry of the device.

Figure 9B:
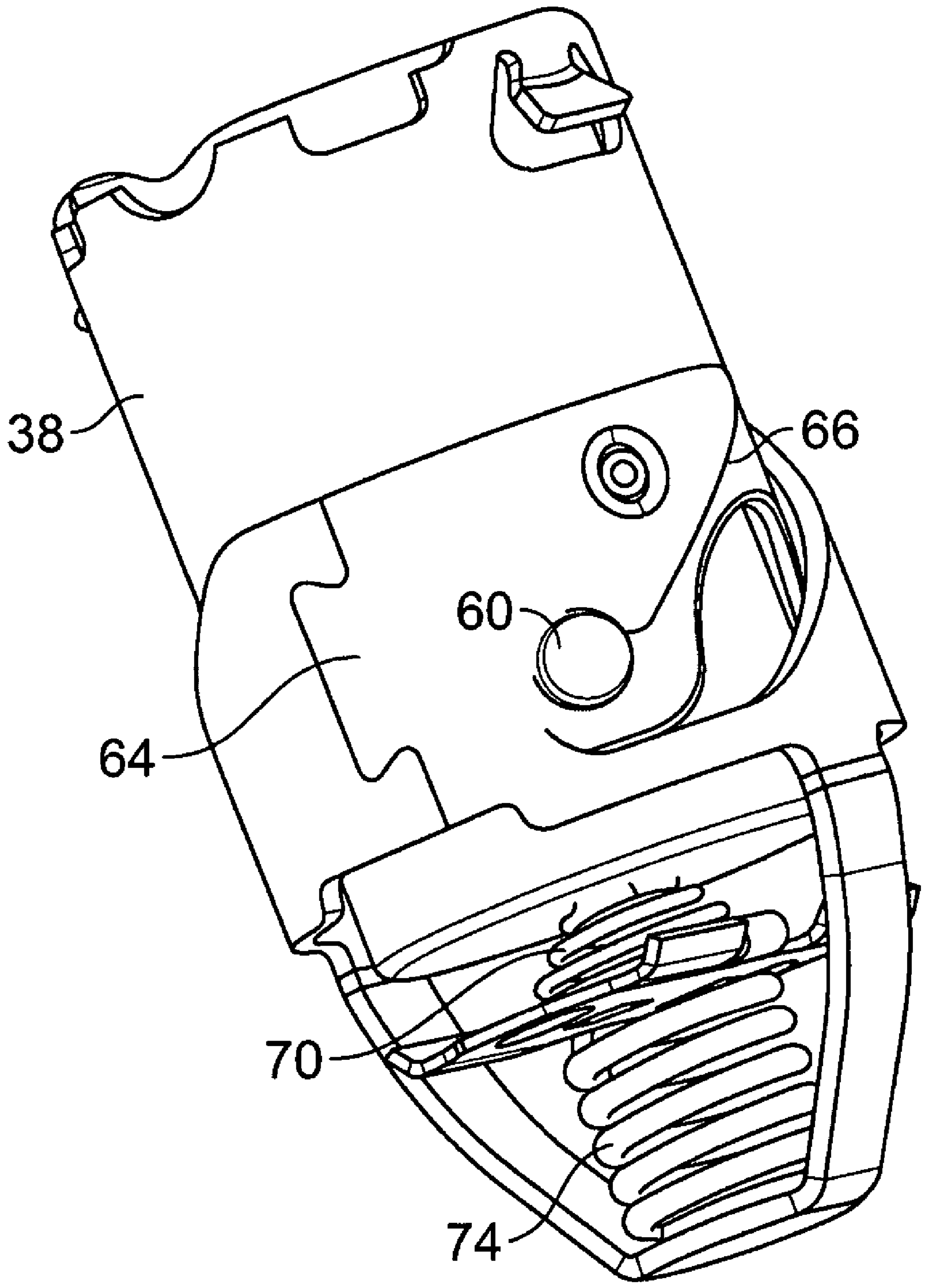
FIG. 9B is an enlarged detail view of the bayonet assembly with the male and female components engaged and the bayonet and battery springs compressed.
Figure 12:
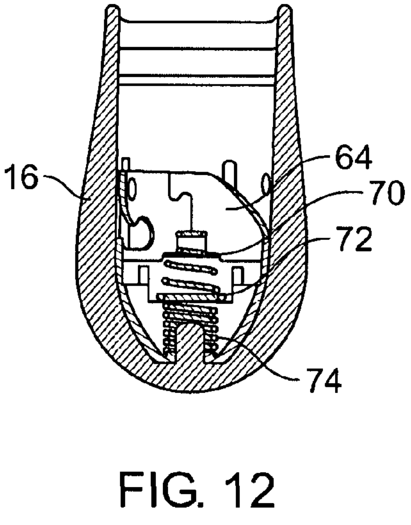
FIG. 12 is a cross-sectional view of the battery shell.

As shown in FIG. 12, the battery spring 70 is mounted on a spring holder 72, which is in turn mounted fixedly to the inner wall of the battery shell 16. The female bayonet component 64 is free to slide axially back and forth within the battery shell 16. In its rest position, the female bayonet component is biased to the base of the battery shell by a bayonet spring 74. The bayonet spring 74 is also mounted on the spring holder 72 and thus its upper end is fixedly mounted with respect to the inner wall of the battery shell. When the battery shell is twisted onto the grip tube, the engagement of the protrusions on the male bayonet component with the angled slots on the female bayonet component draws the female bayonet component forward, compressing the bayonet spring 74. The biasing force of the bayonet spring then causes the female bayonet component to pull the male bayonet component and thus the grip tube toward the battery shell. As a result, any gap between the two parts of the handle is closed by the spring force and the O-ring is compressed to provide a water-tight sealing engagement. When engagement is complete and the protrusions 60 are received into the corresponding V-shaped detent areas 65 of the female bayonet slots 62 (FIG. 9B). This is perceived by the user as a clear and audible click, providing a clear indication that the battery shell has been correctly engaged. This click is the result of the action of the bayonet spring causing the protrusions to slide quickly into the V-shaped detent areas 65.

This resilient engagement of the battery shell with the grip tube compensates for non-linear seam lines between the battery shell and grip tube and other geometry issues such as tolerances. The force applied by the bayonet spring also provides solid and reliable electrical contact between the male and female bayonet components.

The spring-loaded female bayonet component also limits the force acting on the male and female bayonet components when the battery shell is attached and removed. If, after the grip tube and battery shell contact each other, the user continues to rotate the battery shell, the female bayonet component can move forward slightly within the battery shell, reducing the force applied by the protrusions of the male bayonet component. Thus, the force is kept relatively constant, and within a predetermined range. This feature can prevent damage to parts due to rough handling by the user or large part or assembly tolerances.

To accomplish the resilient engagement described above, it is generally important that the spring force of the bayonet spring be greater than that of the battery spring. Generally, the preferred relative forces of the two springs may be calculated as follows:

1. Design the battery spring such that the contact force Fbatmin applied by the spring is sufficient for a minimum battery length.

2. Calculate the battery spring force Fbatmax that would be required for a maximum battery length.

3. Calculate the maximum force Fpmax that would be required to push the battery shell against the grip tube to overcome the friction of the o-ring.

4. Determine the minimum closing force Fclmin with which the battery shell should be pressed against the grip tube in the closed condition.

5. Calculate the force applied by the bayonet spring according to Fbayonet=Fbatmax+Fpmax+Fclmin.

As an example, in some implementations the minimum size battery has a diameter of 9.5 mm and a weight of 15 g, the maximum size battery has a diameter of 10.5 mm and a weight of 150 g, Fbatmax=4 N, Fpmax=2 N, and Fclmin=2 N, and thus Fbayonet=8 N.

Battery Clamp

As discussed above, carrier 34 includes a pair of battery clamp fingers 36 (FIGS. 6, 10). These fingers act as two springs which exert a small clamping force against the battery 18 (FIG. 3). This clamping force is sufficiently strong so as to prevent the battery from rattling against the inner wall of the grip tube or against other parts, reducing the noise generated by the razor during use. Preferably, the clamping force is also sufficiently strong so as to keep the battery from falling out when the battery shell is removed and the grip tube is inverted. On the other hand, the clamping force should be weak enough so that the user can easily remove and replace the battery. The male bayonet component 38 includes open areas 80 (FIG. 4) through which the battery can be grasped by the user for removal.

The dimensions of the spring fingers and their spring force are generally adjusted to allow the spring fingers to hold the weight of the minimum size battery discussed above, to prevent it from falling out when the razor is held vertical, while also allowing the maximum size battery to be easily removed from the grip tube. To satisfy these constraints, it some implementations it is preferred that, with a coefficient of friction between the battery and foil of about 0.15-0.30, the spring force for one finger be about 0.5 N when a minimum size battery (e.g., having a diameter of 9.5 mm and weight of 15 g) is inserted and less than about 2.5 N when a maximum size battery (e.g., having a diameter of 10.5 mm and weight of 150 g) is inserted. In general, the spring fingers will perform the above functions if, when the razor is held with the battery opening pointing downwards, the minimum size battery will not fall out and the maximum size battery can be taken out easily. Whether the maximum size battery can be taken out easily can be tested, for example, by determining whether the maximum size battery will fall out of its own weight when the battery opening is pointed downwards with the battery shell removed.

In other implementations, other battery sizes and/or weights may be used. The above formulas and examples are provided to give general guidance as to how suitable spring forces may be determined.

Referring to FIGS. 6 and 7C, a thin insulation sleeve 40, e.g., of plastic foil, further damps vibration noise and provides safety against a short circuit if the battery surface is damaged. As shown in FIG. 7C, the sleeve 40 is secured with tape 42 to the battery clamp fingers to hold the sleeve in place when the battery is removed and replaced. A suitable material for the insulation sleeve is polyethylene terephthalate (PET) film having a thickness of about 0.06 mm.

Venting Battery Compartment

Under certain conditions, hydrogen can accumulate in the interior of battery-powered appliances. The hydrogen may be released from the battery, or may be created by electrolysis outside the battery. Mixing of this hydrogen with ambient oxygen can form an explosive gas, which could potentially be ignited by a spark from the motor or switch of the device. Thus, any hydrogen should be vented from the razor handle, while still maintaining water tightness.

Figure 13:
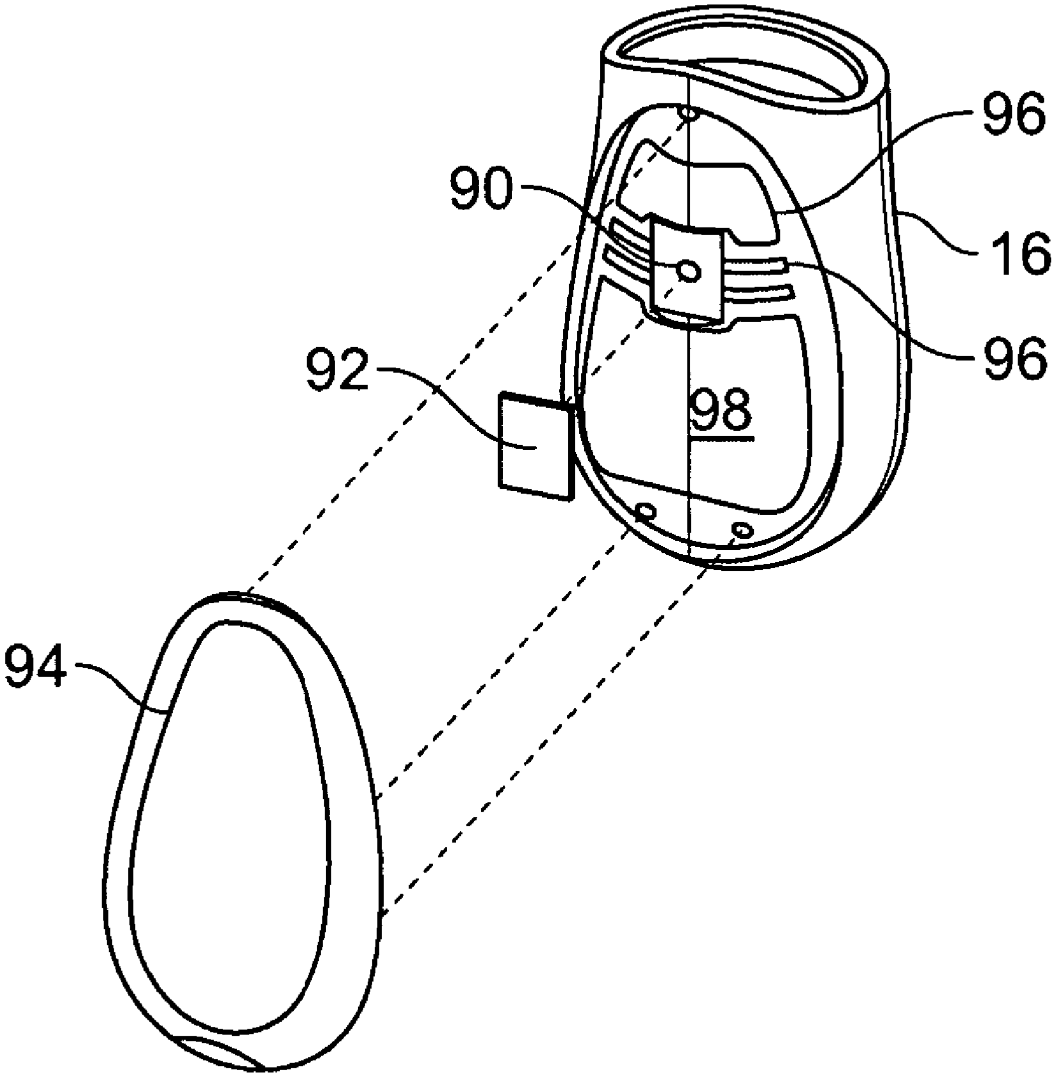
FIG. 13 is an exploded view of the venting components of the battery shell.

Referring to FIG. 13, a vent hole 90 is provided in the battery shell 16. A microporous membrane 92 that is gas-permeable but impermeable to liquids is welded to the battery shell 16 to cover the vent hole 90. A suitable membrane material is polytetrafluoroethylene (PTFE), commercially available from GORE. A preferred membrane has a thickness of about 0.2 mm. It is generally preferred that the membrane have a water-proofness of at least 70 kPa, and an air permeability of at least 12 $l/hr/cm^2$ at 100 mbar overpressure.

An advantage of the microporous membrane is that it will vent hydrogen by diffusion due to the difference in partial pressures of hydrogen on the two sides of the membrane. No increase in total pressure within the razor handle is required for venting to occur.

It is undesirable from an aesthetic standpoint for the user to see the vent hole and membrane. Moreover, if the membrane is exposed there is a risk that the pores of the membrane will become clogged, and/or that the membrane will be damaged or removed. To protect the membrane, a cover 94 is attached to the battery shell over the membrane/vent area, e.g., by gluing. So that gas can escape from under the cover 94, an open area is provided between the inner surface of the cover and the outer surface 98 of the battery shell 16. In the implementation shown in the Figures, a plurality of ribs 96 are provided on the battery shell adjacent the vent hole 90, creating air channels between the cover and the battery shell. However, if desired other structures can be used to create the venting space, for example the cover and/or the grip tube may include a depressed groove that defines a single channel and the ribs may be omitted.

The height and width of the air channels are selected to provide a safe degree of venting. In one example (not shown), there may be one channel on each side of the vent hole, each channel having a height of 0.15 mm and width of 1.1 mm.

Cover 94 may be decorative. For example, the cover may carry a logo or other decoration. The cover 94 may also provide a tactile gripping surface or other ergonomic features.

Electronics

Variable Speed Control

A powered razor is often used to shave different types of hair at different locations on the body. These hairs have markedly different characteristics. For example, whiskers tend to be thicker than hair on the legs. These hairs also protrude from the skin at different angles. For example, stubble is predominantly orthogonal to the skin, whereas leg hairs tend to lay flatter.

The ease with which one can shave these hairs depends, in part, on the frequency at which the cartridge vibrates. Since these hairs have different characteristics, it follows that different vibration frequencies may be optimal for different types of hair. It is therefore useful to provide a way for the user to control this vibration frequency.

Figure 14A:
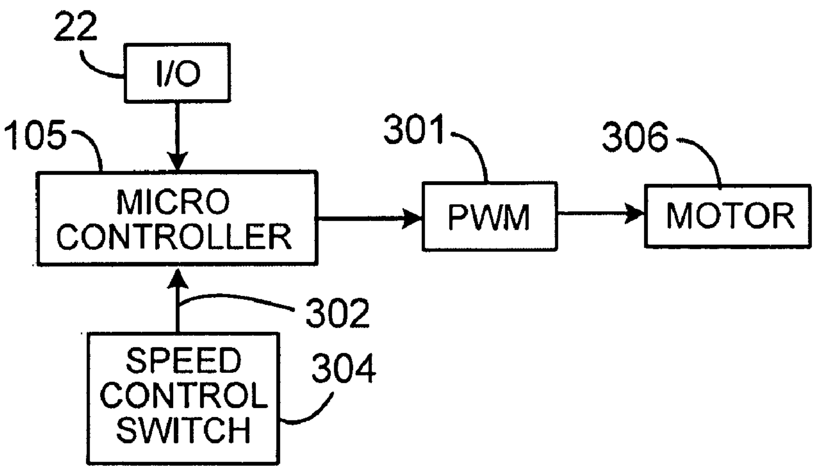
FIG. 14A shows a razor having a speed control switch.

As shown in FIG. 14A, the vibration frequency of the shaving cartridge is controlled by a pulse width modulator 301 having a duty cycle under the control of control logic 105. As used herein, "duty cycle" means the ratio between the temporal extent of a pulse and that of the pause between pulses. A low duty cycle is thus characterized by short pulses with long waits between pulses, whereas a high duty cycle is characterized by long pulses with short waits between pulses. Varying the duty cycle varies the speed of the motor 306, which in turn governs the vibration frequency of the shaving cartridge.

The control logic 105 can be implemented in a microcontroller or other microprocessor based system. Control logic can also be implemented in an application-specific integrated circuit ("ASIC") or as a field-programmable gate array ("FPGA").

The motor 306 can be any energy-consuming device that causes movement of the shaving cartridge. One implementation of a motor 306 includes a miniature stator and rotor coupled to the shaving cartridge. Another implementation of a motor 306 includes a piezoelectric device coupled to the shaving cartridge. Or, the motor 306 can be implemented as a device that is magnetically coupled to the shaving cartridge with an oscillating magnetic field.

In razors having variable speed control, the control logic 105 receives an input speed control signal 302 from a speed-control switch 304. In response to the speed control signal 302, the control logic 105 causes the pulse-width modulator 301 to vary its duty cycle. This, in turn, causes the motor speed to vary. The pulse-width modulator 301 can thus be viewed as a speed controller.

The speed-control switch 304 can be implemented in a variety of ways. For example, the speed-control switch can move continuously. In this case, the user can select from a continuum of speeds. Or, the speed-control switch 304 can have discrete stops, so that the user can select from a set of pre-defined motor speeds.

The speed-control switch 304 can take a variety of forms. For example, the switch 304 can be a knob or a slider that moves continuously or between discrete steps. The switch 304 can also be a set of buttons, with each one assigned to a different speed.

Or, the switch 304 can be a pair of buttons, with one button being assigned to increase and the other to decrease the speed. Or, the switch 304 can be a single button that one presses to cycle through speeds, either continuously or discretely.

Another type of switch 304 is a spring-loaded trigger. This type of switch enables the user to vary the vibration frequency continuously while shaving in the same way that one can continuously vary the speed of a chain saw by squeezing a trigger.

The actuator button 22 can also be pressed into service as a speed control switch 304 by suitably programming the control logic 105. For example, one can program the control logic 105 to consider a double-click or a long press of the actuator button 22 as a command to vary the motor speed.

Among the available speeds is one that is optimized for cleaning the razor. An example of such a speed is the highest possible vibration frequency, which is achieved by causing the control logic 105 to drive the duty cycle as high as possible. Alternatively, the control logic 105 can operate in a cleaning mode in which it causes the motor 306 to sweep through a range of vibration frequencies. This enables the motor 306 to stimulate different mechanical resonance frequencies associated with the blades, the cartridge, and any contaminating particles, such as shaven whisker fragments. The cleaning mode can be implemented as a continuous sweep across a frequency range, or as a stepped sweep, in which the control logic 105 causes the motor 306 to step through several discrete frequencies, pausing momentarily at each such frequency.

Figure 14B:
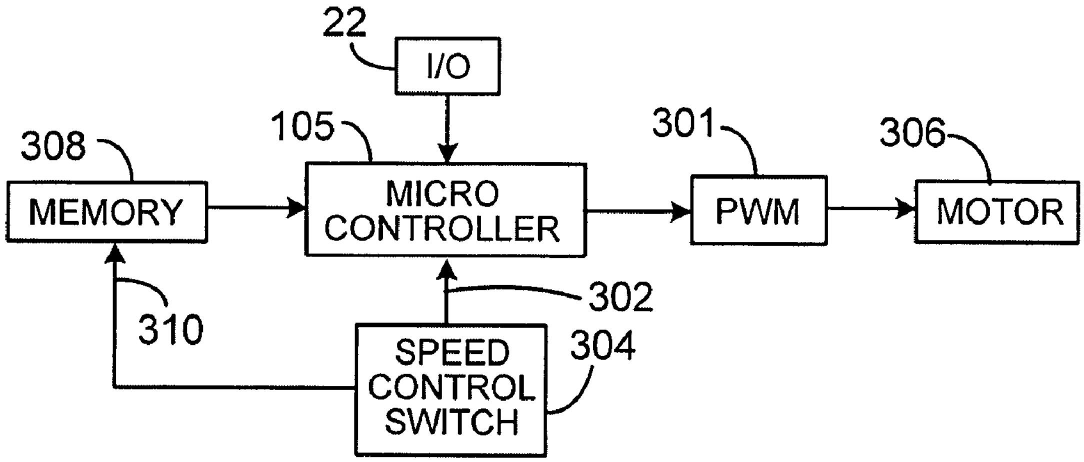
FIG. 14B shows a razor having a speed control switch and a memory for storage of preferred speeds.

In some cases, it is useful to enable the razor to remember one or more preferred vibration frequencies. This is achieved, as shown in FIG. 14B, by providing a memory in communication with the control logic 105. To use this feature, the user selects a speed and causes transmission of a memory signal, either with a separate control, or by pressing the actuator button 22 according to a pre-defined sequence. The user can then recall this memorized speed when necessary, again by either using a separate control or by pressing the actuator button 22 according to a pre-defined sequence.

As shown in FIGS. 3A-3B, the razor features an indirect switching system in which the actuator button 22 controls the motor 306 indirectly through control logic 105 that operates the pulse-width modulator 301. Thus, unlike a purely mechanical switching system, in which the state of the switch directly stores the state of the motor 306, the indirect switching system stores the state of the motor 306 in the control logic 105.

Since the actuator button 22 no longer needs to mechanically store the state of the motor 306, the indirect switching system provides greater flexibility in the choice and placement of the actuator button 22. For example, a razor with an indirect switching system, as disclosed herein, can use ergonomic buttons that combine the advantages of clear tactile feedback and shorter travel. Such buttons, with their shorter travel, are also easier to seal against moisture intrusion.

Another advantage to the indirect switching system is that the control logic 105 can be programmed to interpret the pattern of actuation and to infer, on the basis of that pattern, the user's intent. This has already been discussed above in connection with controlling the speed of the motor 306. However, the control logic 105 can also be programmed to detect and ignore abnormal operation of the actuator button 22. Thus, an unusually long press of the actuator button 22, such as that which may occur unintentionally while shaving, will be ignored. This feature prevents the annoyance associated with accidentally turning off the motor 306.

Voltage Controller

The effectiveness of the razor depends in part on the voltage provided by a battery 316. In a conventional motorized wet razor, there exists an optimum voltage or voltage range. Once the battery voltage is outside the optimum voltage range, the effectiveness of the razor is compromised.

Figure 14C:
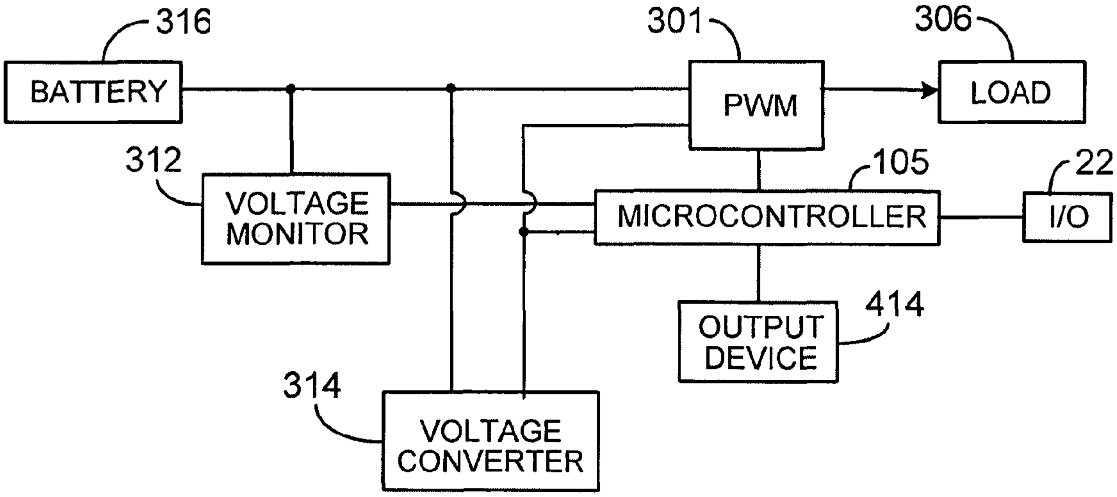
FIG. 14C shows a razor having an indirect power supply.

To overcome this difficulty, the razor features an indirect power supply, shown in FIG. 14C, that separates the voltage of the battery 316 from the voltage actually seen by the motor 306. The voltage actually seen by the motor 306 is controlled by the control logic 105, which monitors the battery voltage and, in response to a measurement of battery voltage, controls various devices that ultimately compensate for variations in battery voltage. This results in an essentially constant voltage as seen by the motor 306.

The method and system described herein for controlling the voltage seen by a motor 306 is applicable to any energy-consuming load. For this reason, FIG. 14C refers to a generalized load 306.

In one embodiment, the motor 306 is designed to operate at an operating voltage that is less than the nominal battery voltage. As a result, when a new battery 316 is inserted, the battery voltage is too high and must be reduced. The extent of the reduction decreases as the battery 316 wears down, until finally, no reduction is necessary.

Voltage reduction is readily carried out by providing a voltage monitor 312 in electrical communication with the battery 316. The voltage monitor 312 outputs a measured battery voltage to the control logic 105. In response, the control logic 105 changes the duty cycle of the pulse-width modulator 301 to maintain a constant voltage as seen by the motor 306. For example, if the battery voltage is measured at 1.5 volts, and the motor 306 is designed to operate at one volt, the control logic 105 will set the duty cycle ratio to be 75%. This will result in an output voltage from the pulse-width modulator 301 that is, on average, consistent with the motor's operating voltage.

In most cases, the duty cycle is a non-linear function of the battery voltage. In that case, the control logic 105 is configured either to perform the calculation using the non-linear function, or to use a look-up table to determine the correct duty cycle. Alternatively, the control logic 105 can obtain a voltage measurement from the output of the pulse-width modulator 301 and use that measurement to provide feedback control of the output voltage.

In another embodiment, the motor 306 is designed to operate at an operating voltage that is higher than the nominal battery voltage. In that case, the battery voltage is stepped up by increasing amounts as the battery 316 wears down. This second embodiment features a voltage monitor 312 as described above, together with a voltage converter 314 that is controlled by the control logic 105. A suitable voltage converter 314 is described in detail below.

A third embodiment combines both of the foregoing embodiments in one device. In this case, the control logic 105 begins by reducing the output voltage when the measured battery voltage exceeds the motor operating voltage. Then, when the measured battery voltage falls below the motor operating voltage, the control logic 105 fixes the duty cycle and begins controlling the voltage converter 312.

In a conventional powered razor, the motor speed gradually decreases as the battery 316 wears down. This gradual decrease provides the user with ample warning to replace the battery 316. However, in a powered razor with an indirect power supply, there is no such warning. Once the battery voltage falls below some lower threshold, the motor speed decreases abruptly, perhaps even in the middle of a shave.

To prevent this inconvenience, the control logic 105, on the basis of information provided by the voltage monitor 312, provides a low-battery signal to a low-battery indicator 414. The low-battery indicator 414 can be a single-state output device, such as an LED, that lights up when the voltage falls below a threshold, or conversely, that remains lit when the voltage is above a threshold and goes out when the voltage falls below that threshold. Or, the low-battery indicator 414 can be a multi-state device, such as a liquid crystal display, that provides a graphical or numerical display indicative of the state of the battery 316.

The voltage monitor 312, in conjunction with the control logic 105, can also be used to disable operation of the razor completely when the battery voltage falls below a deep-discharge threshold. This feature reduces the likelihood of damage to the razor caused by battery leakage that may result from deep-discharge of the battery 316.

Figure 14D:
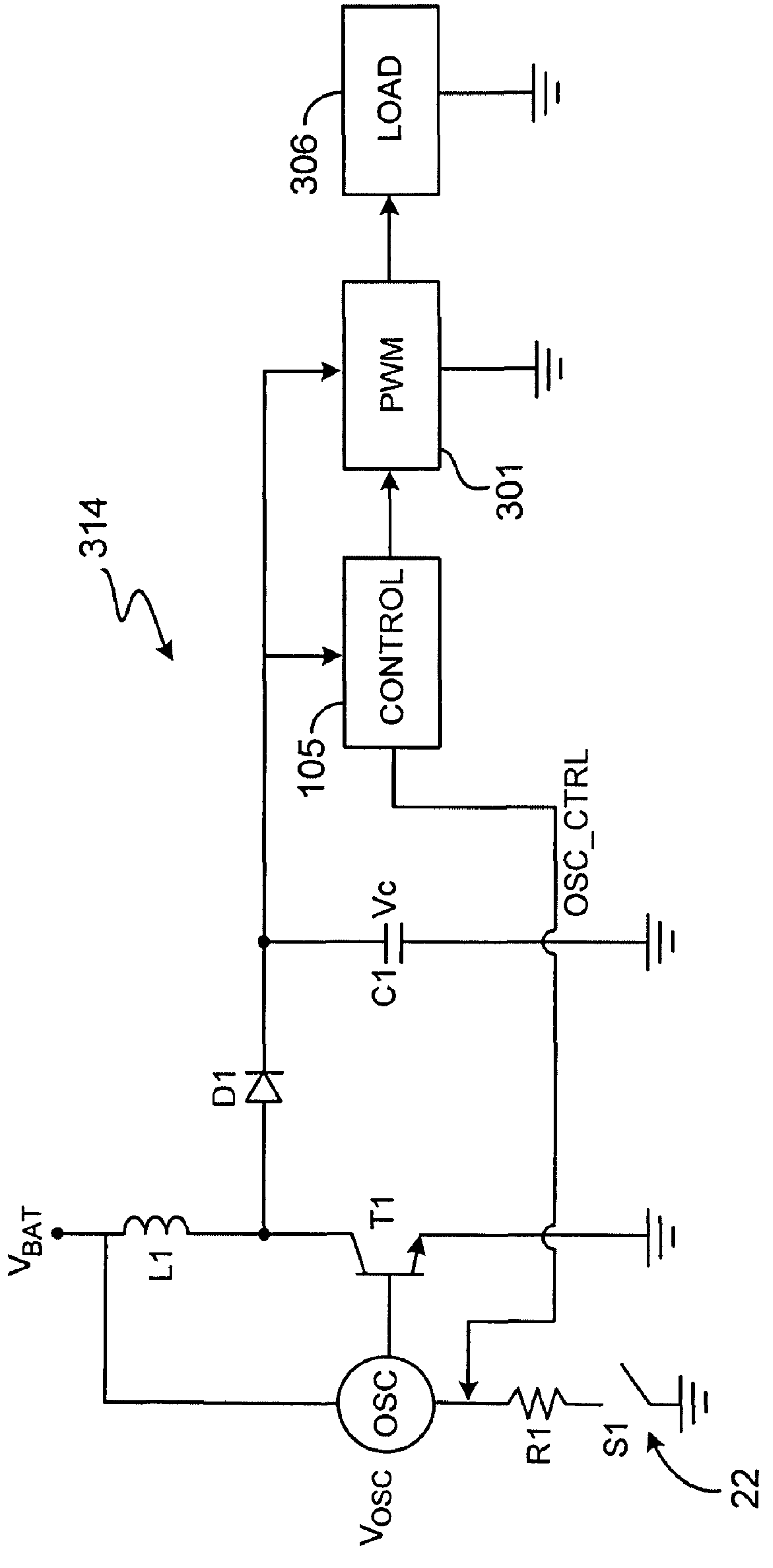
FIG. 14D shows a voltage converter for the indirect power supply of FIG. 14C.

A suitable voltage converter 312, shown in FIG. 14D, features a switch S1 that controls an oscillator. This switch is coupled to the actuator button 22. A user who presses the actuator button 22 thus turns on the oscillator. The oscillator output is connected to the gate of a transistor T1, which functions as a switch under the control of the oscillator. A battery 316 provides a battery voltage $V_{BAT}$.

When the transistor T1 is in its conducting state, a current flows from the battery 316 through an inductor L1, thus storing energy in the inductor L1. When the transistor is in its non-conducting state, the current through the inductor L1 will continue to flow, this time through the diode D1. This results in the transfer of charge through the diode D1 and into the capacitor C1. The use of a diode D1 prevents the capacitor C1 from discharging to ground through the transistor T1. The oscillator thus controls the voltage across the capacitor C1 by selectively allowing charge to accumulate into the capacitor C1, thereby raising its voltage.

In the circuit shown in FIG. 14D, the oscillator causes a time-varying current to exist in the inductor L1. As a result, the oscillator induces a voltage across the inductor L1. This induced voltage is then added to the battery voltage, with the resulting sum being available across the capacitor C1. This results in an output voltage, at the capacitor C1 that is greater than the voltage provided by the battery alone.

The capacitor voltage, which is essentially the output voltage of the voltage converter 312, is connected to both the control logic 105 and to the pulse-width modulator 301 that ultimately drives the motor 306. When the capacitor voltage reaches a particular threshold, the control logic 105 outputs an oscillator control signal "osc_ctr" that is connected to the oscillator. The control logic 105 uses the oscillator control signal to selectively turn the oscillator on and off, thereby regulating the capacitor voltage in response to feedback from the capacitor voltage itself. The set point of this feedback control system, i.e. the voltage across the capacitor C1, is set to be the constant operating voltage seen by the motor 306.

A resistor R1 disposed between the oscillator and ground functions as part of a decoupling circuit to selectively transfer control of the oscillator from the switch S1 to the control logic 105. Before initialization of the control logic, the port that carries the oscillator control signal (the "oscillator control port") is set to be a high-impedance input port. As a result, it is the switch S1 that controls the operation of the oscillator. The resistor R1 in this case prevents a short circuit from the oscillator control port to ground. Following initialization, the oscillator control port becomes a low-impedance output port.

Eventually, the user will complete shaving, in which case he may want to turn off the motor 306. With the control logic 105 now controlling the oscillator, there would be no way to turn off the shaver without removing the battery 316. To avoid this difficulty, it is useful to periodically determine the state of the external switch S1. This is achieved by configuring the control logic 105 to periodically cause the oscillator control port to become a high-impedance input port, so that the voltage across the resistor R1 can be sampled.

In certain types of switches, the state of the switch indicates the user's intent. For example, a switch S1 in the closed position indicates that the user wishes to turn on the motor 306, and a switch S1 in an open position indicates that the user wishes to turn off the motor 306. If the voltage thus sampled indicates that the user has opened the switch S1, then, when the oscillator control port again becomes a low-impedance output port, the control logic 105 causes the oscillator control signal to shut down the oscillator, thereby shutting down both motor 306. In doing to, the control logic 105 also shuts down its own power supply.

In other types of switches, closing of the switch S1 indicates only that the user wishes to change the state of the motor from on to off or vice versa. In embodiments that use such switches, the voltage across the resistor R1 changes only briefly when the user actuates the switch S1. As a result, the control logic 105 causes the voltage across the resistor R1 to be sampled frequently enough to ensure capturing the user's momentary actuation of the switch S1.

Figure 14E:
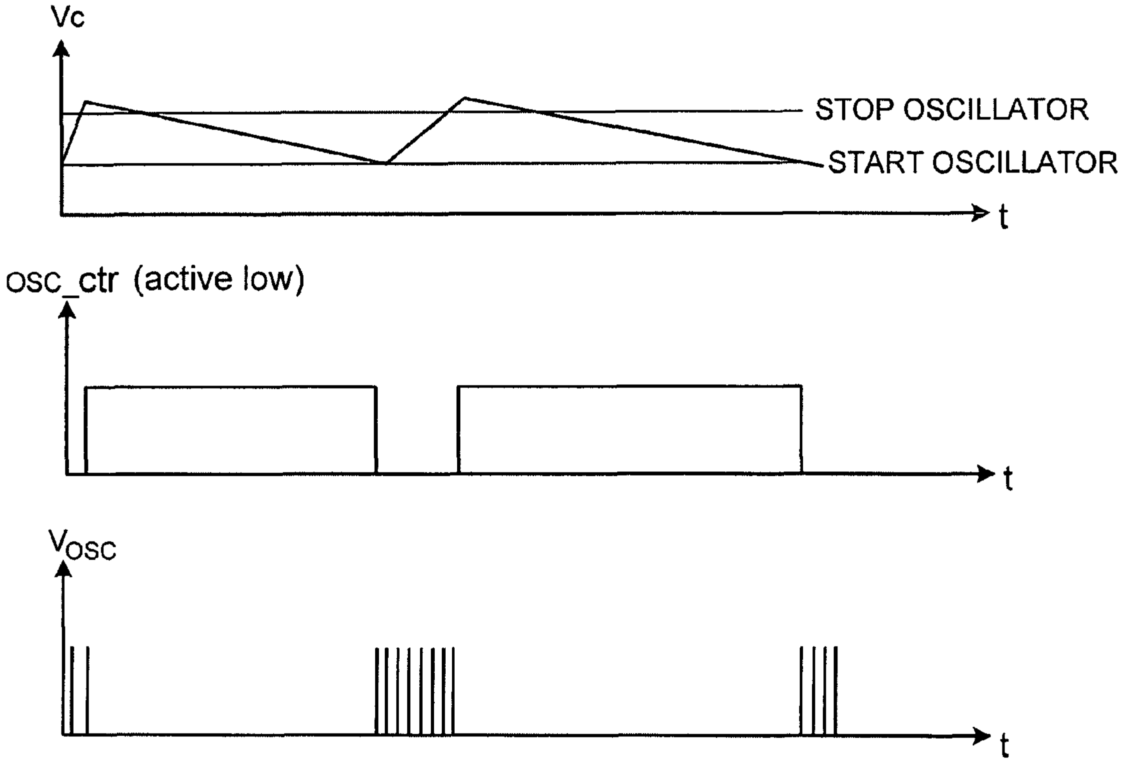
FIG. 14E shows the signals output by the control logic and the oscillator, and their effect on the capacitor voltage.

FIG. 14E shows the interaction between the oscillator control signal, the oscillator output, and the capacitor voltage. When the capacitor voltage falls below a lower threshold, the oscillator control signal turns on, thereby turning the oscillator on. This causes more charge to accumulate in the capacitor C1, which in turn raises the capacitor voltage. Once the capacitor voltage reaches an upper threshold, the oscillator control signal turns off, thereby turning off the oscillator. With no more charge accumulating in the capacitor C1 from the battery 316, the accumulated charge begins to drain away and the capacitor voltage begins to decrease. It does so until it reaches the lower threshold once again, at which point the foregoing cycle repeats itself.

Figure 14F:
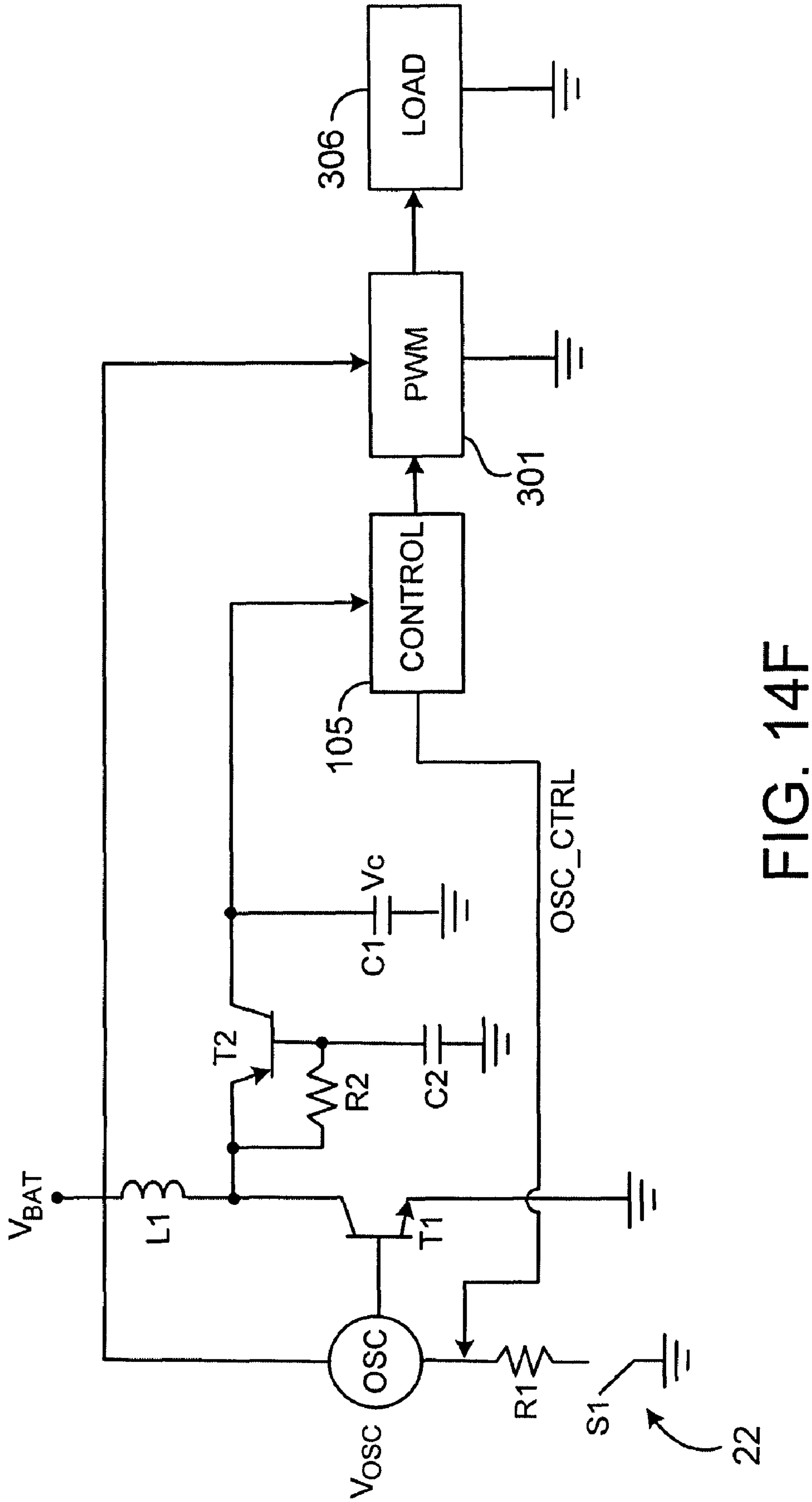
FIG. 14F shows another voltage converter for the indirect power supply of FIG. 14C.

Another embodiment of a voltage converter 312, shown in FIG. 14F is identical to that described in connection with FIG. 14D with the exception that the diode D1 is replaced by an additional transistor T2 having a gate controlled by an RC circuit (R2 and C2). In this embodiment, when the oscillator is inactive, the voltage between the emitter and the base ($V_{BE2}$) of the additional transistor T2 is zero. As a result, current flow through the additional transistor T2 is turned off. This means that no charge is being provided to the capacitor C1 to replace charge that is being drained from the capacitor C1. When the oscillator is active, and the oscillator frequency is greater than the cut-off frequency of the RC circuit, then the voltage between the emitter and the base $V_{BE2}$ will be approximately half the battery voltage $V_{BAT}$. As a result, the additional transistor T2 functions as a diode to pass current to the capacitor C1, while preventing the capacitor C1 from discharging to ground.

Another notable feature of the circuit in FIG. 14F is that the pulse-width modulator 301 is supplied with a voltage directly from the battery 316. As a result, the output voltage of the pulse-width modulator 301 can be no higher than the battery voltage. Thus, in FIG. 14F, the motor 306 is powered by a step down in voltage, whereas the stepped up voltage, which is the voltage across the capacitor C1, is used to power the control logic 105. However, the circuit shown in FIG. 14F can also feature a pulse-width modulator 316 that takes its input from the voltage across the capacitor C1, as shown in FIG. 14D.

Figure 14G:
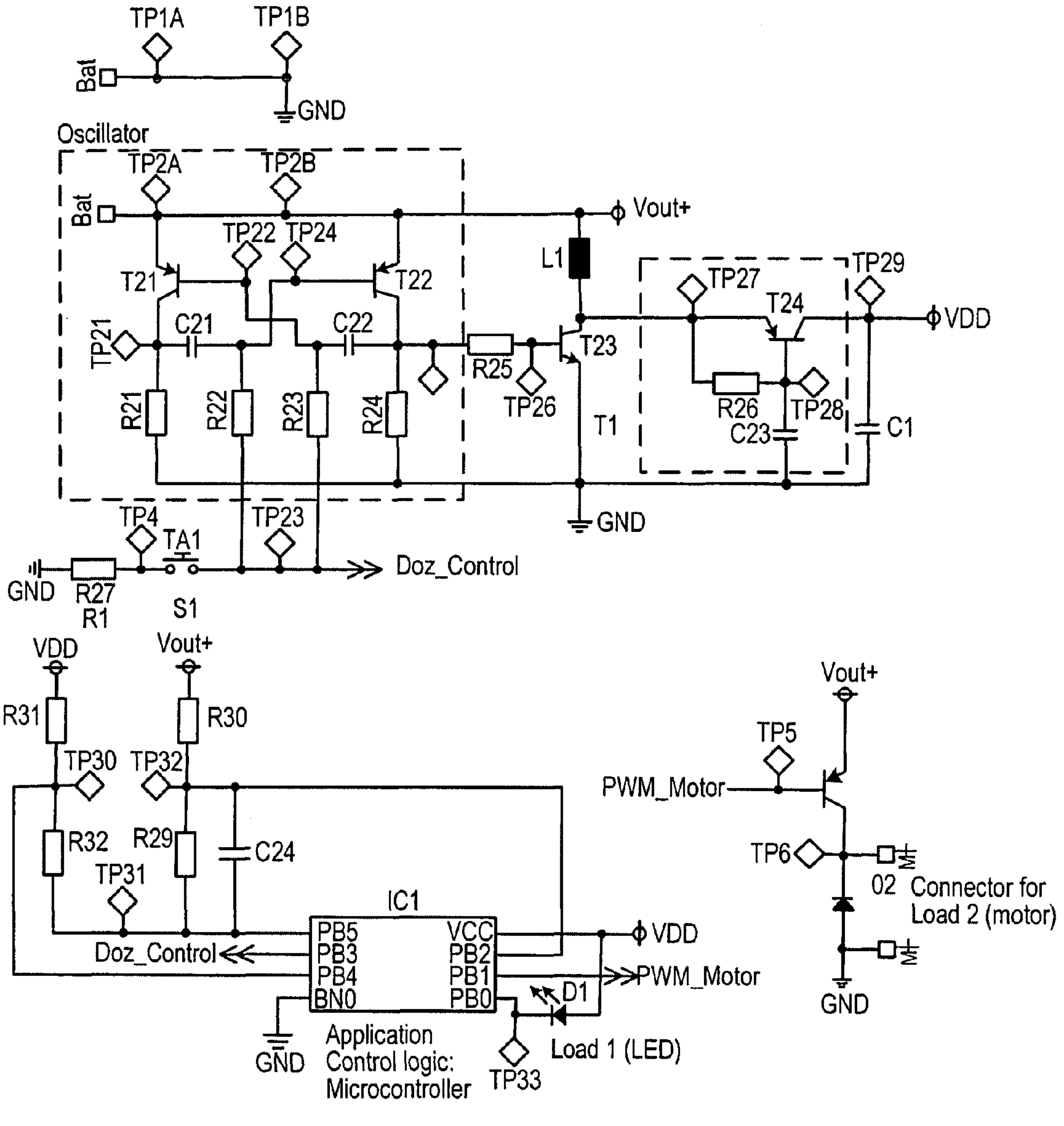
FIG. 14G shows a circuit for supplying power to a load.

FIG. 14G shows a circuit for driving a voltage converter 312 of the type shown in FIG. 14F in greater detail. The oscillator is shown in greater detail, as are the connections associated with the control logic 105. However, the circuit shown in FIG. 14G is otherwise essentially identical to that described in connection with FIG. 14D modified as shown in FIG. 14F.

As described herein, a voltage control system provides a constant operating voltage to a motor 306. However, a powered razor may include loads other than a motor. Any or all of these loads may likewise benefit from a constant operating voltage as provided by the voltage control system disclosed herein.

One load that may benefit from a constant operating voltage is the control logic 105 itself. Commercially available logic circuits 105, are typically designed to operate at a voltage that is higher than the 1.5 volts available in a conventional battery. Hence, a voltage control system that provides a step up in voltage to the control logic is useful to avoid the need for additional batteries.

Cartridge Lifetime Detection

In the course of slicing through hundreds of whiskers on a daily basis, the blades of a razor cartridge inevitably grow duller. This dullness is difficult to detect by visual inspection. As a rule, dull blades are only detected when it is too late. In too many cases, by the time a user realizes that a blade is too dull to use, he has already begun what will be an unpleasant shaving experience.

This final shave with a dull blade is among the more unpleasant aspects of shaving with a razor. However, given the expense of shaving cartridges, most users are understandably reluctant to replace the cartridge prematurely.

Figure 15A:
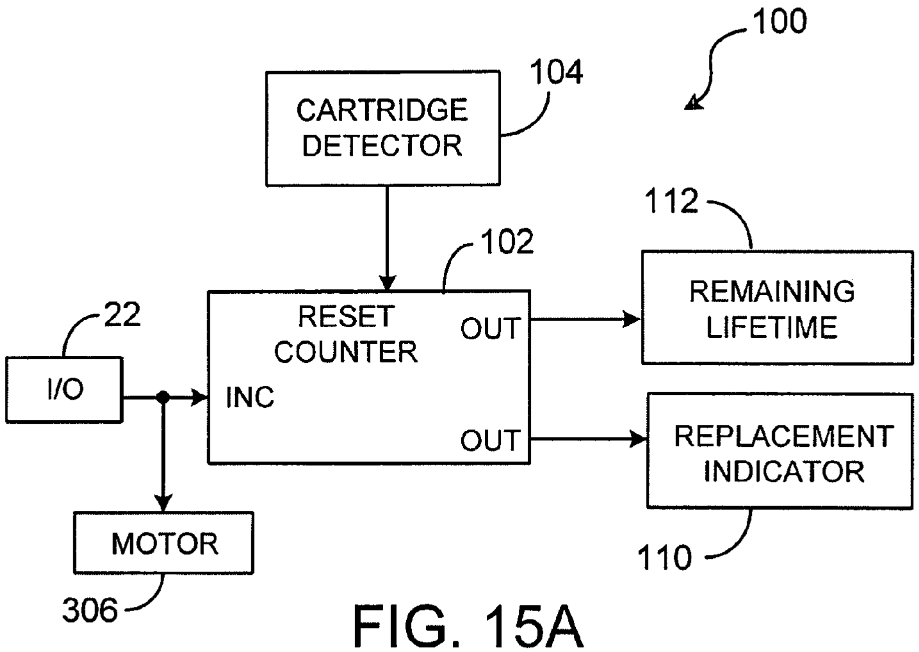
FIG. 15A shows a blade-life indicator that counts the number of times a motor has started since blade replacement.

To assist the user in determining when to replace a cartridge, the razor includes a blade lifetime indicator 100, shown in FIG. 15A, having a counter 102 that maintains a count indicative of the extent to which the blades have been already used. The counter is in communication with both the actuator button 22 on the handle 10, and with a cartridge detector 104, mounted at the distal end of the razor head 12. A suitable counter 102 can be implemented in the control logic 105.

A cartridge detector 104 can be implemented in a variety of ways. For example a cartridge detector 104 may include a contact configured to engage a corresponding contact on the cartridge.

Razor cartridges can include one, two, or more than two blades. Throughout this description, a single blade is referred to. It is understood, however, that this blade can be any blade in the cartridge, and that all the blades are subject to wear.

In operation, when the user replaces the cartridge, the cartridge detector 104 sends a reset signal to the counter 102. Alternatively, a reset signal can be generated manually, for example by the user pressing a reset button, or by the user pressing the actuator button according to a predetermined pattern. This reset signal causes the counter 102 to reset its count.

The ability to detect the cartridge can be used for applications other than resetting the count. For example, the cartridge detector 104 can be used to determine whether the correct cartridge has been used, or whether a cartridge has been inserted improperly. When connected to the control logic 105, the cartridge detector 104 can cause the motor to be disabled until the condition is corrected.

When the user shaves, the counter 102 changes the state of the count to reflect the additional wear on the blade. There are a variety of ways in which the counter 102 can change the state of the count.

In the implementation shown in FIG. 15A, the counter 102 changes the count by incrementing it each time the motor is turned on. For users whose shaving time varies little on a shave-to-shave basis, this provides a reasonably accurate basis for estimating blade use.

In some cases, the number of times the motor has been turned on may misestimate the remaining lifetime of a blade. Such errors arise, for example, when a person "borrows" one's razor to shave their legs. This results in the shaving of considerable acreage with only a single activation of the motor.

Figure 15B:
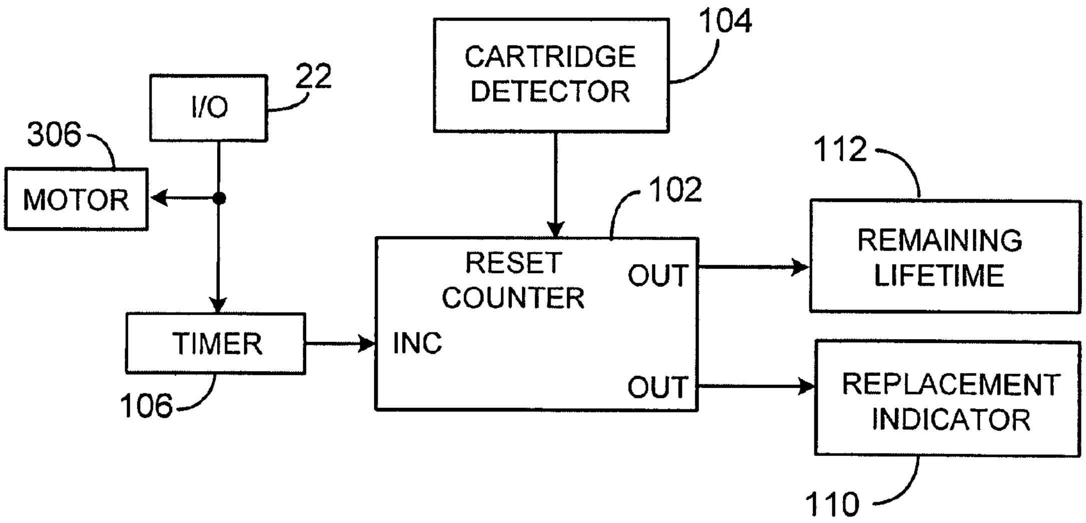
FIG. 15B shows a blade-life indicator that accumulates motor-operating time since blade replacement.

The foregoing difficulty is overcome in an alternative implementation, shown in FIG. 15B, in which the actuator button 22 and the counter 102 are in communication with a timer 106. In this case, the actuator button 22 sends signals to both the control logic 105 and the timer 106. As a result, the counter 102 maintains a count indicative of the accumulated motor-operating time since the last cartridge replacement.

The accumulated motor-operating time provides an improved indicator of blade wear. However, as a rule, the blade does not contact the skin at all times that the motor is operating. Thus, an estimate based on the motor's operating-time cannot help but overestimate blade wear. In addition, the motor switch may be inadvertently turned on, for example when the razor is jostled in one's luggage. Under those circumstances, not only will the battery be drained, but the counter 102 will indicate a worn blade, even though the blade has yet to encounter a single whisker.

Figure 15C:
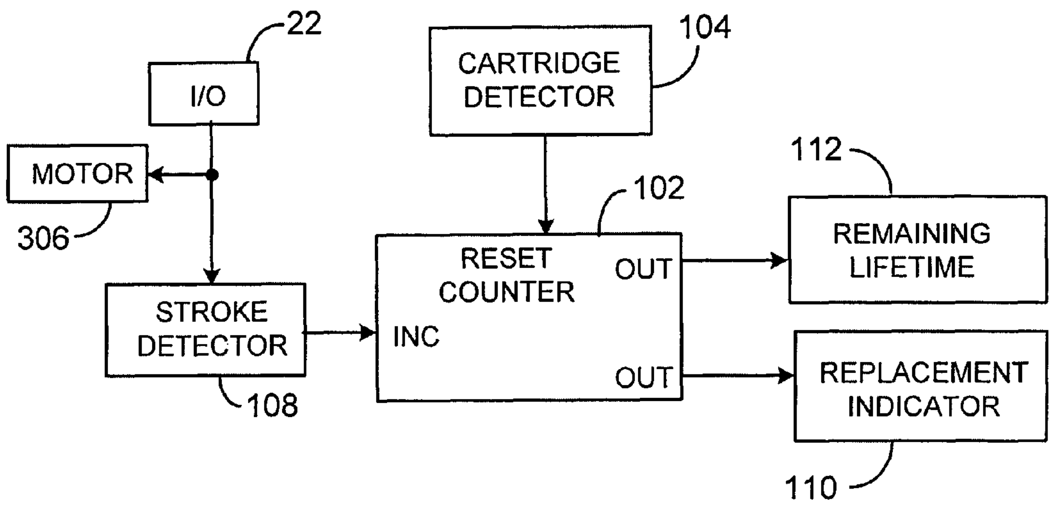
FIG. 15C shows a blade-life indicator that counts the number of strokes since blade replacement.

Another implementation, shown in FIG. 15C, includes a counter 102 in communication with a stroke-detector 108. In this case, the actuator button 22 signals both the stroke detector 108 and the control logic 105. Thus, turning on the motor also turns on the stroke-detector 108.

The stroke-detector 108 detects contact between the blade and the skin and sends a signal to the counter 102 upon detecting such contact. In this way, the stroke-detector 108 provides the counter 102 with an indication that the blade is actually in use. In the implementation of FIG. 15C, the counter 102 maintains a count indicative of the accumulated number of strokes that the blade has endured since the cartridge was last replaced. As a result, the counter 102 ignores time intervals during which the motor is running but the blade is not actually in use.

A variety of implementations are available for the stroke-detector 108. Some implementations rely on the change between the electrical properties on or near the skin and electrical properties in free space. For example, the stroke-detector 108 can detect skin contact by measuring a change in resistance, inductance, or capacitance associated with contacting the skin. Other implementations rely on the difference between the acoustic signature of a blade vibrating on the skin and that of a blade vibrating in free space. In these implementations, the stroke-detector 108 can include a microphone connected to a signal processing device configured to distinguish between the two signatures. Yet other implementations rely on changes to the motor's operating characteristics when the blade touches the skin. For example, because of the increased load associated with skin contact, the motor's appetite for current may increase and the motor's speed may decrease. These implementations include ammeters or other current indicating devices, and/or speed sensors.

An estimate that relies on the number of strokes may nevertheless be inaccurate because not all strokes have the same length. For example, a stroke down a leg may wear the blade more than the several strokes needed to shave a moustache. The stroke-detector 108, however, cannot tell the difference between strokes of different lengths.

Figure 15D:
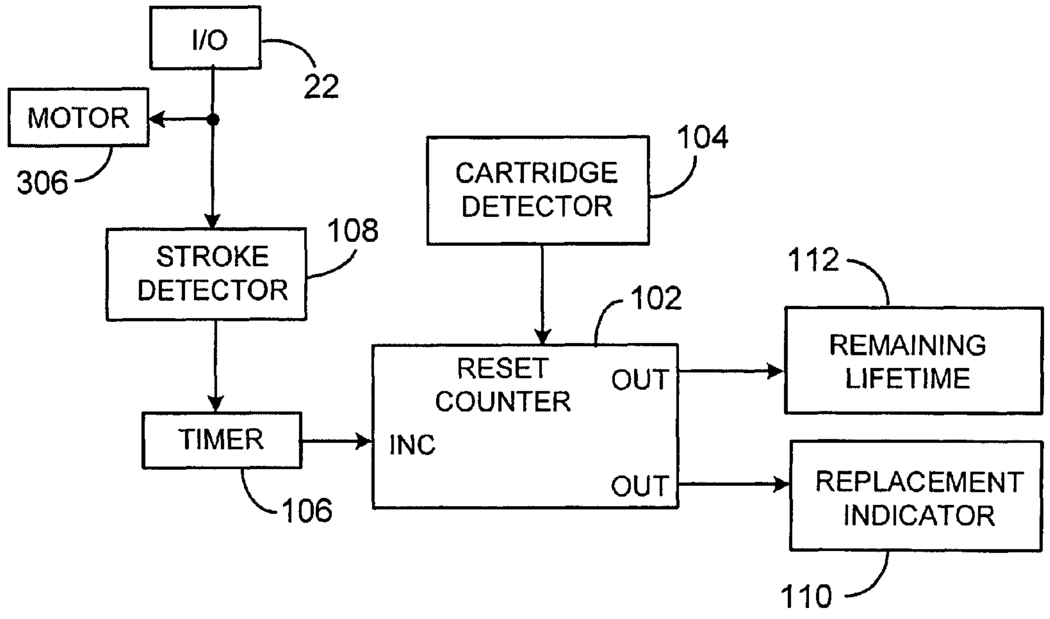
FIG. 15D shows a blade-life indicator that accumulates stroke time since blade replacement.

Another implementation, shown in FIG. 15D, includes both a stroke-detector 108 in communication with the actuator button 22 and a timer 106. The timer 106 is in communication with the counter 102. Again, the actuator button signals both the stroke detector 108 and the control logic 105. The stroke detector 108 stops and starts the timer 106 in response to detecting the beginning and end of a stroke respectively. This implementation is identical to that in FIG. 15C except that the counter 102 now maintains a count indicative of the accumulated time that the cartridge has been in contact with the skin (referred to as "stroke time") since the last cartridge replacement.

A stroke-detector 108 in conjunction with a timer 106 as described in connection with FIG. 15D has applications other than providing information indicative of blade wear. For example, the absence of a stroke for an extended period of motor operation may indicate that the motor has been turned on or left on inadvertently. This may occur when the razor is jostled in one's luggage. Or it may occur because one has absent-mindedly overlooked the need to turn off the motor after shaving.

In the embodiments of FIGS. 1A-1D, the counter 102 is in communication with a replacement indicator 110. When the count reaches a state indicative of a worn blade, the counter 102 sends a replacement signal to the replacement indicator

110. In response, the replacement indicator 110 provides the user with a visual, audible, or tactile cue to indicate that the blade is worn out. Exemplary cues are provided by an LED, a buzzer, or a governor that varies the motor speed, or otherwise introduces an irregularity, such as a stutter, into the operation of the motor.

The counter 102 includes an optional remaining-lifetime output that provides a remaining-life signal indicative of an estimate of the remaining life of the blade. The remaining-life estimate is obtained by comparing the count and an expected lifetime. The remaining life signal is provided to a remaining-life indicator 112. A suitable remaining-life indicator 112 is a low-power display showing the expected number of shaves remaining before the worn-out signal activates the worn-out indicator. Alternatively, the remaining lifetime estimate may be shown graphically, for example by flashing a light with a frequency indicative of a remaining lifetime estimate, or by selectively illuminating several LEDs according to a predefined pattern.

Travel Lock

In some cases, it is possible to inadvertently turn on the motor of a powered wet razor. This may occur, for example, during travel when other items in a toilet kit shift and press the actuator button 22. If this occurs, the motor will draw on the battery until the battery runs down.

Figure 16A:
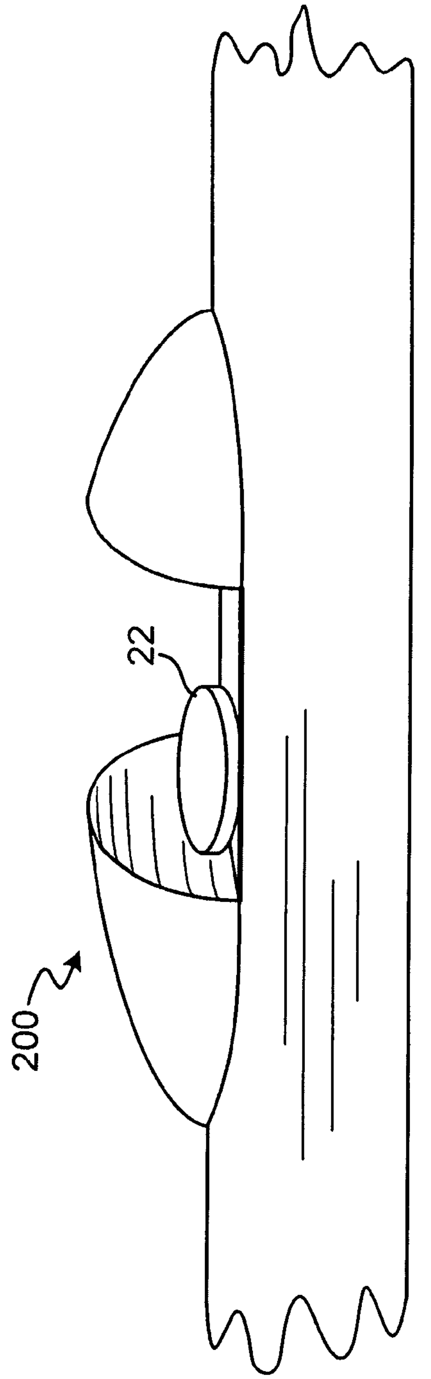
FIG. 16A shows a mechanical lock.

To avoid this difficulty, the razor can include a lock. One such lock is a mechanical lock 200 on the actuator button 22 itself. An example of a mechanical lock 200 is a sliding cover, as shown in FIG. 16A, that covers the actuator button 22 when the razor is put away. Other examples of mechanical locks are associated with a holder for the razor, rather than with the razor itself. For example, the switch can be configured to cover the actuator button 22 when the razor is stowed in the holder.

Figure 16B:
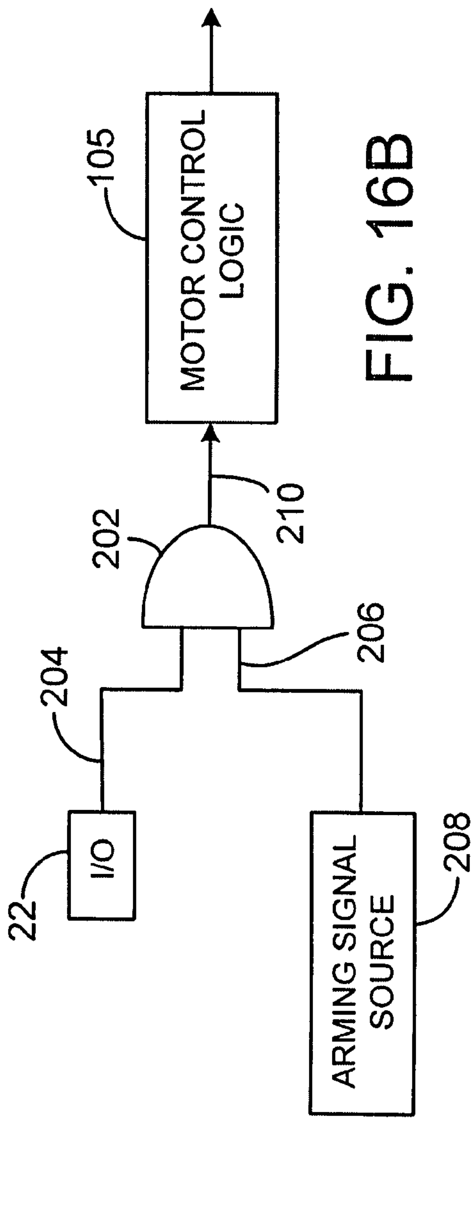
FIG. 16B shows a locking circuit in which a lock signal disarms the razor.

Other locks are electronic in implementation. One example of an electronic lock is a locking circuit 202, as shown in FIG. 16B, that receives a switch signal 204 from the actuator button 22 (labeled "1/0" in the figure) and an arming signal 206 from an arming circuit 208 (labeled "arming-signal source" in the figure). The locking circuit 202 outputs a motor control signal 210 to the control logic 105 in response to the states of the switch signal 204 and the arming signal 206.

The arming circuit 208 is said to arm and disarm the locking circuit 202 using the arming signal 206. As used herein, the locking circuit 202 is considered armed when pressing the actuator button 22 starts and stops the motor. The locking circuit 202 is considered disarmed when pressing the actuator button 22 fails to operate the motor at all.

Arming circuits 208 and locking circuits 202 typically include digital logic circuits that change the state of their respective outputs in response to state changes in their respective inputs. As such, they are conveniently implemented within the control logic 105. However, although digital logic elements provide a convenient way to build such circuits, nothing precludes the use of analog or mechanical components to carry out similar functions. Examples of arming circuits 208, or portions thereof, are described below.

One example of an arming circuit 208 includes an arming switch. In this implementation, the user operates the arming switch to change the state of the arming signal 206. The user then presses the actuator button 22 to start the motor. After shaving, the user again presses the actuator button 22, this time to stop the motor. He then operates the arming switch to disarm the locking circuit 202.

Alternatively, the arming circuit 208 can be configured to disarm the locking circuit automatically upon detecting that the motor has been turned off. In this case, the arming circuit 208 will generally include an input to receive a signal indicating that that the motor has been turned off.

As used herein, "switch" includes buttons, levers, sliders, pads, and combinations thereof for effecting a change in the state of a logic signal. Switches need not be actuated by physical contact but can instead be activated by radiant energy carried, for example, optically or acoustically. A switch can be directly user-operable. One example of such a switch is the actuator button 22. Alternatively, the switch can be operated by a change in the disposition of the razor, for example by replacing a razor in its holder, or by removing and installing a cartridge.

As suggested by FIG. 16B, the locking circuit 202 can be viewed abstractly as an "AND" gate. Although the locking circuit can be implemented as an "AND" gate, any digital logic circuit with a suitable truth table can be used to carry out the arming function of the locking circuit 202. For example, the locking circuit 202 can be implemented by placing an arming switch in series with the actuator button 22.

In another implementation, the arming circuit 208 includes a timer. The output of the timer causes the arming circuit 208 to initially arm the locking circuit 202. Upon the lapse of a predetermined shaving interval, the timer causes the arming circuit 208 to disarm the locking circuit 202, thereby turning off the motor. The length of the shaving interval corresponds to a typical shaving time. A suitable length is between about five and seven minutes.

In this implementation, upon pressing the actuator button 22, the motor will run either until the actuator button 22 is pressed again, or until the lapse of the shaving interval. Should the user take longer than the shaving interval to shave, the motor will turn off, in which case, the user must press the actuator button 22 again to restart the motor and complete the shave. To avoid this, the arming circuit 208 can be provided with an adaptive feedback loop that extends the default shaving interval in response to "extensions" requested by the user.

When the arming circuit 208 includes a timer, a reset input on the timer is connected to either the output of the locking circuit 202 or to the actuator button 22. This enables the timer to reset itself in response to a change in the state of the switch signal 204. In particular, the timer resets itself whenever the switch signal 204 turns off the motor. This can occur when either the user presses the actuator button 22 prior to the lapse of the shaving interval, or upon the lapse of the shaving interval.

In another implementation, the arming circuit 208 includes a decoder having an input connected to either the actuator button 22 or to a separate decoder input-button. In this case, the state of the arming signal 206, which depends on the decoder's output is controlled manually by the user, either by pressing the actuator button 22 according to a predefined pattern, or, in the alternative implementation, by operating the decoder input-button.

For example, in the case in which the decoder takes its input from the actuator button 22, the decoder may be programmed to respond to an extended press of the actuator button 22 or a rapid double-click of the actuator button 22 by causing a change to the state of the arming signal 206. Alternatively, in the case in which the decoder accepts input from a separate decoder input-switch, the user need only operate the decoder input-switch. There is no need for the user to remember how to lock and unlock the motor with the actuator button 22.

In those implementations that rely on the user to change the state of the arming signal 206, it is useful to provide an indicator, such as an LED, that provides the user with feedback on whether he has successfully changed the state of the arming signal 206.

In other implementations, the arming circuit 208 relies on the disposition of the razor to determine whether it should disarm the locking circuit 202. For example, the arming circuit 208 may include a contact switch that detects the installation and removal of a shaving cartridge. When the cartridge is removed, the arming circuit 208 disarms the locking circuit 202. Alternatively, the arming circuit 208 can include a contact switch that detects whether or not the razor has been stowed in its holder. In this case, when the arming circuit 208 detects that the razor has been stowed in its holder, it disarms the locking circuit 202.

In the case in which the arming circuit 208 responds to the presence of a cartridge, a user prevents the motor from accidentally turning on by removing the cartridge from the handle. To operate the razor normally the user re-installs the cartridge on the handle.

In the case in which the arming circuit 208 responds to the presence of a holder, the user prevents the motor from accidentally turning on by stowing it in its holder. The operate the razor normally, the user removes it from its holder, which is something he would have to do in any case.

While the embodiment described herein controls the operation of a motor, the disclosed methods and devices can be used to prevent battery drain from inadvertent consumption of energy by any load.

Shaving Force Measurement

During the course of a shave, the user applies a force that presses the blade against the skin. The magnitude of this shaving force affects the quality of the shave. A shaving force that is too low may be insufficient to force the whiskers into an optimum cutting position. One that is too high may result in excessive skin abrasion. Because of the varying contours of the face, it is difficult for the user to maintain even a constant shaving force, much less an optimal shaving force.

This difficulty is overcome in razors that include force-measurement circuits 400 as shown in FIGS. 4A and 4B. The illustrated force-measurement circuits 400 exploit the fact that in a motorized razor, the shaving force governs, in part, the load applied to the motor 306 that drives the blade. The operating characteristics of this motor 306 thus change in response to the shaving force.

Figure 17A:
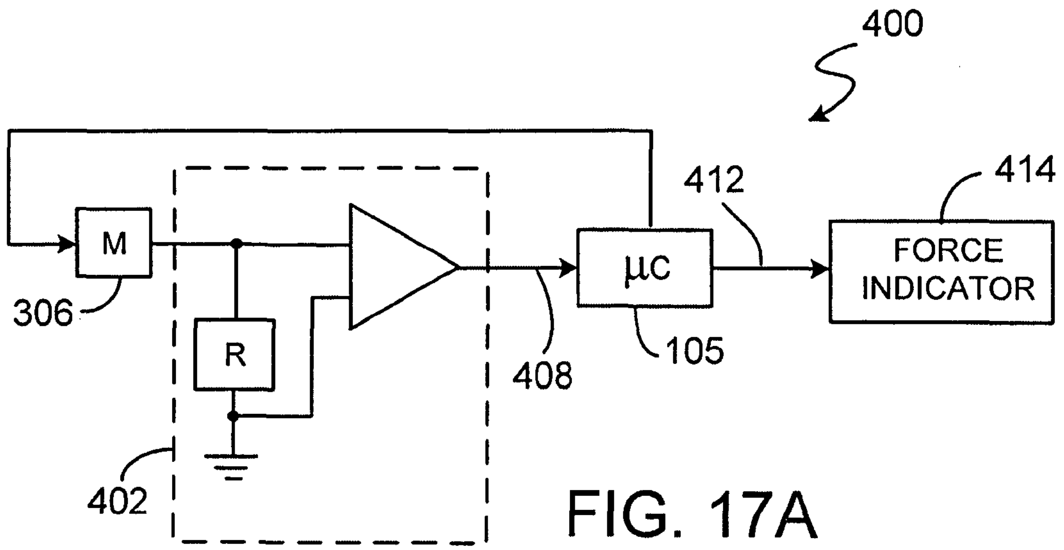
FIG. 17A shows a force-measurement circuit that senses variations in current drawn by the motor.

The force-measurement circuit 400 shown in FIG. 17A exploits the change in the current drawn by the motor 306 in response to different loads. As the shaving force increases, the motor 306 draws more current in response. The implementation in FIG. 17A thus features a current sensor 402 that senses the magnitude of the current drawn by the motor 306. The current sensor provides a force signal 408 to the control logic 105.

Figure 17B:
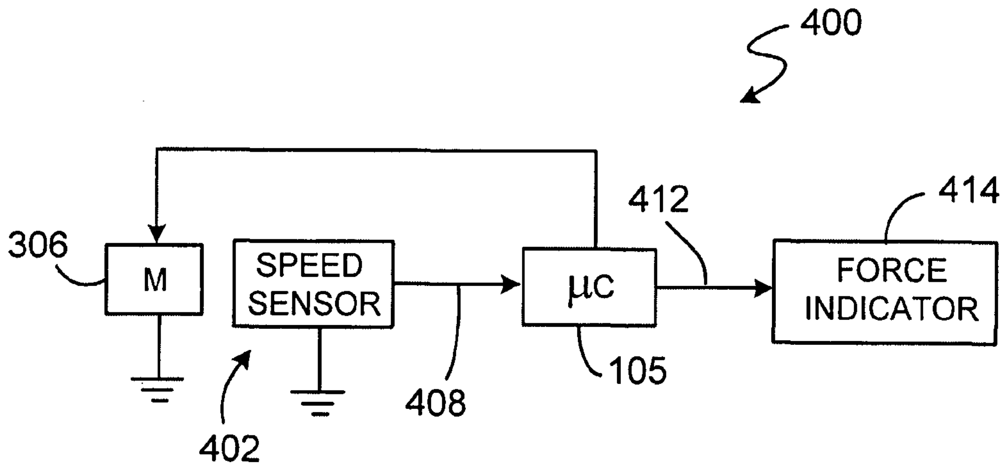
FIG. 17B shows a force-measurement circuit that senses variations in motor speed.

The force-measurement circuit shown in FIG. 17B exploits the change in motor speed that results from different loads on the motor 306. As the shaving force increases, the motor speed decreases. The implementation shown in FIG. 17B thus features a speed sensor 410 for sensing the motor speed. This speed sensor provides a force signal 408 to the control logic 105.

The control logic 105 receives the force signal 408 and compares it with a nominal force signal indicative of what the force signal would be under a known load. Typically, the known load is selected to correspond to a razor vibrating in free space, without contacting any surface. Alternatively, the control logic 105 compares the force signal 408 with a pair of nominal force signals corresponding to a razor vibrating with two known loads, one corresponding to a minimum shaving force and another corresponding to a maximum shaving force.

The control logic 105 then determines whether the applied shaving force falls outside the band defined by the upper and lower shaving force thresholds. If the applied shaving force falls outside the band, the control logic 105 sends a correction signal 412 to an indicator 414. The indicator 414 then transforms the correction signal 412 into an observable signal that is observable by the user, either because it is visible, audible, or provides some tactile stimulation.

For an acoustic observable signal, the indicator 414 can be a speaker that provides an audible signal to the user. For an optically observable signal, the indicator 414 can be an LED that provides a visible signal to the user. For a tactile observable signal, the motor 306 itself is used as an indicator 414. Upon detecting an incorrect shaving force, the control logic 105 sends a correction signal 412 to the motor 306 to introduce a disturbance into its normal operation. For example, the control logic 105 might send a correction signal 412 that causes the motor 306 to stutter.

In all the foregoing cases, the signal for an insufficient shaving force can differ from that for an excessive shaving force so that the user will know how to correct the applied shaving force.

A number of embodiments of the invention have been described. Nevertheless, it will be understood that various modifications may be made without departing from the spirit and scope of the invention.

For example, while the razors described above include a vibration motor and provide a vibrating functionality, other types of battery-operated functionality may be provided, such as heating.

Moreover, while in the embodiment described above a receiving member containing a window is welded into an opening in the grip tube, if desired the window may be molded into the grip tube, e.g., by molding a transparent membrane into the grip tube.

In some implementations, other types of battery shell attachment may be used. For example, the male and female portions of the battery shell and grip tube may be reversed, so that the battery shell carries the male portion and the grip tube carries the female portion. As another example, the battery shell may be mounted on the grip tube using the approach described in copending U.S. Ser. No. 11/115,885, filed on Apr. 27, 2005, the complete disclosure of which is incorporated herein by reference. Other mounting techniques may be used in some implementations, e.g., latching systems that are released by a push button or other actuator.

Additionally, in some implementations the razor may be disposable, in which case the battery shell may be permanently welded to the grip tube, as it is not necessary or desirable that the consumer access the battery. In disposable implementations, the blade unit is also fixedly mounted on the razor head, rather than being provided as a removable cartridge.

Other venting techniques may also be used, for example venting systems that employ sealing valve members rather than a microporous membrane. Such venting systems are described, for example, in U.S. Ser. No. 11/115,931, filed on Apr. 27, 2005, the complete disclosure of which is incorporated herein by reference.

Some implementations include some of the features described above, but do not include some or all of the electronic components discussed herein. For example, in some cases the electronic switch may be replaced by a mechanical switch, and the printed circuit board may be omitted.

Accordingly, other embodiments are within the scope of the following claims.

A number of embodiments of the invention have been described. Nevertheless, it will be understood that various modifications may be made without departing from the spirit and scope of the invention.

For example, while the razors described above include a vibration motor and provide a vibrating functionality, other types of battery-operated functionality may be provided, such as heating.

Moreover, while in the embodiment described above a receiving member containing a window is welded into an opening in the grip tube, if desired the window may be molded into the grip tube, e.g., by molding a transparent membrane into the grip tube.

In some implementations, other types of battery shell attachment may be used. For example, the male and female portions of the battery shell and grip tube may be reversed, so that the battery shell carries the male portion and the grip tube carries the female portion. As another example, the battery shell may be mounted on the grip tube using the approach described in copending U.S. Ser. No. 11/115,885, filed on Apr. 27, 2005, the complete disclosure of which is incorporated herein by reference. Other mounting techniques may be used in some implementations, e.g., latching systems that are released by a push button or other actuator.

Additionally, in some implementations the razor may be disposable, in which case the battery shell may be permanently welded to the grip tube, as it is not necessary or desirable that the consumer access the battery. In disposable implementations, the blade unit is also fixedly mounted on the razor head, rather than being provided as a removable cartridge.

Other venting techniques may also be used, for example venting systems that employ sealing valve members rather than a microporous membrane. Such venting systems are described, for example, in U.S. Ser. No. 11/115,931, filed on Apr. 27, 2005, the complete disclosure of which is incorporated herein by reference.

Some implementations include some of the features described above, but do not include some or all of the electronic components discussed herein. For example, in some cases the electronic switch may be replaced by a mechanical switch, and the printed circuit board may be omitted.

Accordingly, other embodiments are within the scope of the following claims.

What is claimed is:

1. A handle for a razor having a battery-powered functionality, comprising:

a housing constructed to hold a battery having a length, the housing forming an elongated battery chamber comprising an open end opposing a closed end for receiving the battery through the open end in a direction only along the length of the battery, and within the housing, a carrier fixed to the housing made of metal comprising a pair of opposing battery clamp fingers configured to exert a clamping force against the battery for restricting the battery from moving out of the chamber through the open end, wherein the fingers extend longitudinally, parallel to a long axis of the battery, and wherein electrical contact is established between a battery shell and the carrier when the battery shell is placed on said open end.

2. The razor handle of claim 1 wherein the clamping force is sufficient to inhibit vibration of the battery within a grip tube.

3. The razor handle of claim 1 wherein the clamping force is sufficient to prevent the battery from falling out of the housing when the housing is held with a long axis of the housing oriented vertically.

4. The razor handle of claim 1 wherein each finger exerts a spring force of about 0.5 N when a battery having a diameter of 9.5 mm is inserted into the housing, and less than about 2.5 N when a battery having a diameter of 10.5 mm is inserted into the housing.

5. The razor handle of claim 1 wherein the housing defines a battery opening, and the fingers exert a predetermined force on the battery that is such that, when the razor handle is held with the battery opening pointing downwards, a battery having a diameter of 9.5 mm will not fall out and a battery having a diameter of 10.5 mm can be taken out easily.

6. The razor handle of claim 1 wherein the carrier includes open areas through which the battery can be grasped by a user to facilitate battery removal.

7. The razor handle of claim 1 further comprising an insulation sleeve inside the carrier.

8. The razor handle of claim 7 wherein the insulation sleeve comprises a plastic foil.

9. The razor handle of claim 8 further comprising a tape disposed to secure the insulation sleeve inside the carrier to hold the sleeve in place when the battery is removed and replaced.

10. The razor handle of claim 8 wherein the plastic foil comprises a polyethylene terephthalate (PET) film.

11. The razor handle of claim 1 wherein the housing comprises a unitary grip portion constructed to receive a razor head at one end thereof; and a battery cover, mounted on the grip portion.

12. The razor handle of claim 11 wherein the grip portion and the battery cover, when joined, together define a watertight unit prior to mounting of the razor head on the grip portion.

13. The razor handle of claim 11 further comprising a plurality of components that provide the battery-powered functionality, wherein all components of the razor that provide the battery-powered functionality are disposed within the grip portion.

14. The razor handle of claim 11, further comprising a razor head, fixedly mounted on the grip portion.

15. The razor handle of claim 11 wherein a battery cover is removably mounted on the grip portion.

16. The razor handle of claim 1 further comprising electronic components, mounted on the carrier, in electrical communication with the battery.

17. The razor handle of claim 15 wherein the carrier includes a portion constructed to engage a corresponding portion of the battery cover.

* * * * *